United States Patent
Hirajoh

(10) Patent No.: US 10,622,024 B2
(45) Date of Patent: Apr. 14, 2020

(54) INTERFACE APPARATUS AND RECORDING APPARATUS

(71) Applicant: Godo Kaisha IP Bridge 1, Tokyo (JP)

(72) Inventor: Tomotaka Hirajoh, Tokyo (JP)

(73) Assignee: GODO KAISHA IP BRIDGE 1, Tokyo (JP)

( * ) Notice: Subject to any disclaimer, the term of this patent is extended or adjusted under 35 U.S.C. 154(b) by 25 days.

(21) Appl. No.: 15/865,342

(22) Filed: Jan. 9, 2018

(65) Prior Publication Data

US 2018/0130503 A1    May 10, 2018

Related U.S. Application Data

(62) Division of application No. 15/103,039, filed as application No. PCT/JP2014/082270 on Dec. 5, 2014, now Pat. No. 9,899,062.

(30) Foreign Application Priority Data

Dec. 9, 2013  (JP) ................ 2013-254504
Dec. 9, 2013  (JP) ................ 2013-254513

(51) Int. Cl.
G06K 9/00      (2006.01)
G06K 7/10      (2006.01)
(Continued)

(52) U.S. Cl.
CPC ............ G11B 27/34 (2013.01); G06F 3/0485 (2013.01); G06F 3/04847 (2013.01);
(Continued)

(58) Field of Classification Search
USPC ................ 386/248, 239, 280, 278
See application file for complete search history.

(56) References Cited

U.S. PATENT DOCUMENTS 6,580,870 B1 *  6/2003  Kanazawa ............. G11B 27/34
                                                        386/240
9,148,643 B2 *  9/2015  Walker .................. H04N 21/00
(Continued)

FOREIGN PATENT DOCUMENTS

EP    2530675      12/2012
JP    H06-251082   9/1994
(Continued)

OTHER PUBLICATIONS

International Search Report, PCT/JP2014/082270, dated Mar. 24, 2015.
(Continued)

*Primary Examiner* — Daquan Zhao
(74) *Attorney, Agent, or Firm* — Young & Thompson

(57) ABSTRACT

An interface apparatus for designating a link destination, is provided with: a range designating device (110) for designating a desired range in a screen on which motion picture content is reproduced; a range mark setting device (107b) for superimposing and displaying a range mark indicating the designated range on the motion picture content; a movement operating device (110, 105, 107b) for moving the range mark in a desired direction, along with a lapse of reproduction time of the motion picture content in the screen; a link destination inputting device (110) for inputting link destination identification information as what corresponds to the range mark; and a holding device (106) for holding position information indicating a position of the range mark, in association with the link destination identification information and each time point in the reproduction time.

3 Claims, 21 Drawing Sheets

(51) Int. Cl.

| | | |
|---|---|---|
| *G11B 27/34* | (2006.01) | |
| *H04N 21/858* | (2011.01) | |
| *G06F 3/0485* | (2013.01) | |
| *G06F 3/0488* | (2013.01) | |
| *H04N 21/41* | (2011.01) | |
| *G06F 3/0484* | (2013.01) | |
| *G11B 27/036* | (2006.01) | |
| *H04N 21/81* | (2011.01) | |
| *H04N 21/845* | (2011.01) | |
| *G06T 11/60* | (2006.01) | |
| *H04N 21/4725* | (2011.01) | |
| *H04N 21/4728* | (2011.01) | |

(52) U.S. Cl.
CPC ...... *G06F 3/04883* (2013.01); *G06F 3/04886* (2013.01); *G11B 27/036* (2013.01); *H04N 21/4126* (2013.01); *H04N 21/812* (2013.01); *H04N 21/8455* (2013.01); *H04N 21/858* (2013.01); *H04N 21/4725* (2013.01); *H04N 21/4728* (2013.01)

(56) References Cited

U.S. PATENT DOCUMENTS

| | | |
|---|---|---|
| 9,319,539 B2 | 4/2016 | Yamaguchi |
| 2006/0078160 A1 | 4/2006 | Fujita et al. |
| 2012/0308202 A1 | 12/2012 | Murata et al. |
| 2013/0038555 A1 | 2/2013 | Maeda et al. |
| 2013/0117772 A1 | 5/2013 | Sugiyama et al. |
| 2013/0204919 A1 | 8/2013 | Kitazato |
| 2013/0283177 A1 | 10/2013 | Seo et al. |
| 2013/0322843 A1 | 12/2013 | Suzuki et al. |
| 2013/0324850 A1 | 12/2013 | Petruzzelli et al. |
| 2014/0096174 A1 | 4/2014 | Sadja et al. |
| 2014/0344697 A1* | 11/2014 | Liu .................. G06F 3/04883 715/720 |

FOREIGN PATENT DOCUMENTS

| | | |
|---|---|---|
| JP | H09-97039 | 4/1997 |
| JP | H11-161664 | 6/1999 |
| JP | 2001-188738 | 7/2001 |
| JP | 2003-099783 | 4/2003 |
| JP | 2003-116095 | 4/2003 |
| JP | 2007-019769 | 1/2007 |
| JP | 2008-146492 | 6/2008 |
| JP | 2009-065551 | 3/2009 |
| JP | 2009-117974 | 5/2009 |
| JP | 2010-004556 | 1/2010 |
| JP | 2010-108310 | 5/2010 |
| JP | 2011-087017 | 4/2011 |
| JP | 2011-234301 | 11/2011 |
| JP | 2011-259184 | 12/2011 |
| JP | 2012-504907 | 2/2012 |
| JP | 2013-020459 | 1/2013 |
| JP | 2013-229026 | 11/2013 |
| WO | WO 2008/093632 | 8/2008 |
| WO | 2011/115260 | 9/2011 |

OTHER PUBLICATIONS

Yukihiro Iwabuchi, Doga ni Hyperlink o Settei dekiru Interactive Authoring Tool: V Active 1.0J <Nippon Systemware>, Hello! PC, Aug. 8, 1997 (Aug. 8, 1997), vol. 4, No. 14, pp. 212 to 213.
Supplementary Partial European Search Report dated Sep. 22, 2017 in corresponding European Patent Application No. 14869156.1.

* cited by examiner

FIG. 3

| Link Area Information | | | | |
|---|---|---|---|---|
| Time Info. | Time point info. | Coordinate information | Gesture | Transition information |
| 10s – 15s | 10.0s | [0.0, 0.0], [1.0, 1.0] | Tap | movie://sample_movie.mp4 |
| 15s – 20s | 15.0s | [0.5, 0.5], [1.0, 1.0] | Swipe | image://sample_image.png |
| 20s – 25s | 20.0s | [0.5, 0.0], [1.0, 1.0] | Drag | http://www.example.com/ |
| 30s – 32s | 30.0s | [0.0, 0.0], [0.2, 0.2] | Tap | movie://sample_movie.mp4 |
|  | 30.5s | [0.2, 0.2], [0.4, 0.4] |  |  |
|  | 31.0s | [0.4, 0.4], [0.6, 0.6] |  |  |
|  | 31.5s | [0.6, 0.6], [0.8, 0.8] |  |  |
|  | 32.0s | [0.8, 0.8], [1.0, 1.0] |  |  |
| 40s – 42.5s | 40.0s | [0.0, 0.0], [0.5, 0.5] | Swipe | image://sample_image.png |
|  | 40.5s | [0.0, 0.0], [0.6, 0.6] |  |  |
|  | 41.0s | [0.0, 0.0], [0.7, 0.7] |  |  |
|  | 41.5s | [0.0, 0.0], [0.8, 0.8] |  |  |
|  | 42.0s | [0.0, 0.0], [0.9, 0.9] |  |  |
|  | 42.5s | [0.0, 0.0], [1.0, 1.0] |  |  |
| 50s – 60s | 50.0s | [0.0, 0.0], [0.2, 0.2] | Drag | http://www.example.com/ |
|  | 55.0s | [0.8, 0.8], [1.0, 1.0] |  |  |

INTERFACE APPARATUS AND RECORDING APPARATUS

TECHNICAL FIELD

The present invention relates to an interface apparatus for designating a link destination configured to establish, on a content provider side such as an advertiser, a mechanism in which motion picture content is jumped to a desired link destination while the motion picture content is being reproduced and displayed on a viewer side, an interface apparatus for a viewer configured to use data for designating the link destination generated by such an interface apparatus for designating the link destination so as to jump motion picture content to a desired link destination on the viewer side while the motion picture content is being reproduced and displayed, and a computer program configured to make a computer function as each of such apparatuses.

BACKGROUND ART

For a system related to this type of apparatus, there are proposed various systems established in such a manner that if an object that constitutes content that is being displayed is selected, another content of a link destination associated with the object is displayed (refer to Patent Literatures 1 to 3).

CITATION LIST

Patent Literature

Patent Literature 1: Japanese Patent Application Laid Open No. 2011-259184
Patent Literature 2: Japanese Patent Application Laid Open No. 2010-108310
Patent Literature 3: Japanese Patent Application Laid Open No. 2008-146492

SUMMARY OF INVENTION

Technical Problem

In such a system, however, in performing an operation of associating the link destination with the object that exists in a motion picture as a part of motion picture content regarding an operation of designating the link destination on the content provider side such as an advertiser, specialty such as computer program knowledge or system engineer knowledge is required, and the link destination cannot be designated or changed by a simple or quick operation. Alternatively, possibly, it may generally become complicated, sophisticated, and large-scale to establish the system or data for designating the link destination depending on the content and movements of various motion picture content.

Moreover, the content to which the link destination can be designated may lose arbitrariness. In other words, only for the exclusive content established to be able to designate the link destination in advance, a viewer may later select the link destination.

In particular, according to studies by the present inventors, it is common practice to frequently change, add, or delete the link destination to be designated on the content provider side such as an advertiser, an advertising agency, and a broadcast station. Thus, in this type of system, it is desirable that the link destination can be designated and changed, as occasion demands, by a simple or quick operation.

In view of the aforementioned technical problems, for example, it is therefore an object of the present invention to provide an interface apparatus for designating a link destination configured to easily specify a desired link destination in correspondence with an arbitrary object that exists in motion picture content on the content provider side such as an advertiser, an advertising agency, a broadcast station and the like. It is another object of the present invention to provide an interface apparatus for a viewer configured to use data for designating a link destination generated by such an apparatus for designating the link destination, so as to jump motion picture content to a desired link destination on a viewer side while the motion picture content is being reproduced. It is another object of the present invention to provide a computer program configured to make a computer function as each of such interface apparatuses.

Moreover, however, according to the studies by the present inventors, even for the same content, it becomes complicated and hard to realize such a mechanism for associating the link destination on a displaying device that has various aspect ratios, variable lateral magnification and longitudinal magnification, and different segments and that is provided for a wide or normal, and large or small television, a personal computer, a mobile device, a smart phone, a cell-phone, or the like. Alternatively, in order to respond with such various displaying devices, there is a need to perform a complicated operation of associating the link destination depending on types of the display devices.

In particular, specification, plans, types and the like of the displaying devices are also progressive, and it is considered to be desirable in this type of system to be able to easily respond with the existing or future various displaying devices.

In view of the aforementioned technical problems, for example, it is therefore an object of the present invention to provide an interface apparatus for a viewer configured to jump motion picture content to a desired link destination even if it is reproduced on various displaying devices having different specifications. It is another object of the present invention to provide a computer program configured to make a computer function as such an interface apparatus.

Solution to Problem

The above object of the present invention can be achieved by a first interface apparatus for designating a link destination according to the present invention, comprising: a range designating device configured to designate a desired range in a screen on which motion picture content is reproduced by still image reproduction or motion picture reproduction; a range mark setting device configured to superimpose and display a range mark indicating the range designated by said range designating device, on the motion picture content in the screen; a movement operating device configured to move the range mark in a desired direction, along with a lapse of reproduction time of the motion picture content in the screen on which the motion picture content is reproduced by the motion picture reproduction; a link destination inputting device configured to input link destination identification information for identifying a desired link destination as what corresponds to the range mark; and a holding device configured to hold position information indicating a position of the range mark, in association with (i) the link destination identification information inputted by said link destination inputting device and (ii) each time point in the reproduction time, wherein said holding device holds the position information at each time point while the range mark is moved, and does not hold the position information at each time point while the range mark is not moved.

According to the first interface apparatus for designating the link destination in the present invention, an operation of designating the desired link destination can be easily performed on arbitrary motion picture content on a user side of the apparatus (i.e. a person on a content provider side). Particularly even under an environment in which it is highly desired to simply designate, change, or add the link destination or perform similar actions, it is resultantly possible to simply designate, set, change, or add the desired link destination or perform similar actions correspondingly to an arbitrary object. Moreover, it is possible to establish a mechanism for selecting the link destination on the motion picture content on a viewer side, by using a much smaller amount of data in comparison with a case where various data for link destination is established for each frame of the motion picture content as performed in the background art, which is extremely useful in practice.

The above object of the present invention can be achieved by a second interface apparatus for designating a link destination according to the present invention, comprising: a range designating device configured to designate a desired range in a screen on which motion picture content is reproduced by still image reproduction or motion picture reproduction; a range mark setting device configured to superimpose and display a range mark indicating the range designated by said range designating device, on the motion picture content in the screen; a movement operating device configured to move the range mark in a desired direction, along with a lapse of reproduction time of the motion picture content in the screen on which the motion picture content is reproduced by the motion picture reproduction; a link destination inputting device configured to input link destination identification information for identifying a desired link destination as what corresponds to the range mark; and a holding device configured to hold position information indicating a position of the range mark, in association with (i) the link destination identification information inputted by said link destination inputting device and (ii) each time point in the reproduction time, wherein said link destination inputting device is configured to input a plurality of link destination identification information associated with a plurality of link destinations depending on distinction between a plurality of types of operations, or instead thereof or in addition thereto, said link destination inputting device is configured to input the destination identification information while being able to select a plurality of display forms associated with the link destination depending on distinction between a plurality of types of operations.

According to the second interface apparatus for designating the link destination in the present invention, the operation of designating the desired link destination can be easily performed on arbitrary motion picture content on the user side of the apparatus (i.e. the person on the content provider side). Particularly even under the environment in which it is highly desired to simply designate, change, or add the link destination or perform similar actions, it is resultantly possible to simply designate, set, change, or add the desired link destination or perform similar actions correspondingly to an arbitrary object. Moreover, it is also possible on the user side of the apparatus to simply establish an environment, in which content of the link destination can be displayed in different forms or in which content of different link destinations can be displayed as different types of input operations are performed later on one object on the viewer side.

The above object of the present invention can be achieved by a third interface apparatus for designating a link destination according to the present invention, comprising: a range designating device configured to designate a desired range in a screen on which motion picture content is reproduced by still image reproduction or motion picture reproduction; a range mark setting device configured to superimpose and display a range mark indicating the range designated by said range designating device, on the motion picture content in the screen; a movement operating device configured to move the range mark in a desired direction, along with a lapse of reproduction time of the motion picture content in the screen on which the motion picture content is reproduced by the motion picture reproduction; a link destination inputting device configured to input link destination identification information for identifying a desired link destination as what corresponds to the range mark; and a holding device configured to hold position information indicating a position of the range mark, in association with (i) the link destination identification information inputted by said link destination inputting device and (ii) each time point in the reproduction time, wherein the screen is a screen of a touch panel, and said movement operating device uses a contact with said touch panel by an operator as a trigger to start movement of the range mark, and uses an end of the contact as a trigger to end the movement of the range mark.

According to the third interface apparatus for designating the link destination in the present invention, the operation of designating the desired link destination can be easily performed on arbitrary motion picture content on the user side of the apparatus (i.e. the person on the content provider side). Particularly even under the environment in which it is highly desired to simply designate, change, or add the link destination or perform similar actions, it is resultantly possible to simply designate, set, change, or add the desired link destination or perform similar actions correspondingly to an arbitrary object. Moreover, an operation performed by the user of the apparatus (i.e. an operator of the "touch panel" herein) between the start of the movement and the end of the movement of the range mark is further simplified. As a whole, the operation of moving the range mark can be performed, more simply and quickly.

The above object of the present invention can be achieved by first to third computer programs according to the present invention for making a computer respectively function as the first to third interface apparatus for designating the link destination according to the present invention.

According to the first to third computer programs in the present invention, the first to third interface apparatuses for designating the link destination according to the present invention described above can be relatively easily realized as a computer system reads and executes the computer program from a recording medium for storing the computer program, or as the computer system executes the computer program after downloading the program through a communication device.

The above object of the present invention can be achieved by an interface apparatus for a viewer according to the present invention, for controlling a reproducing device to selectively perform a reproduction of content of a link destination, instead of or in addition to a reproduction of motion picture content, during the reproduction of the motion picture content, on the basis of (i) position information indicating a relative position of a desired range in a screen of the motion picture content with respect to an entire image area of the motion picture content, by using coordinates represented by, under a condition that a frame video of the motion picture content have longitudinal and lateral maximum values in size, a ratio to the maximum values, in association with each time point in a reproduction time of the motion picture content, and (ii) link destination identification information for identifying a desired link destination as what corresponds to the desired range, said interface apparatus for the viewer comprising: a position selecting device configured to select a desired display position or area in the screen in which the motion picture content is reproduced by still image reproduction or motion picture reproduction; a determining device configured to determine whether or not at least a part of the display position or area selected by said position selecting device is included in the desired range determined from the relative position indicated by the position information; and a link destination controlling device configured to control said reproducing device to reproduce the content of the link destination indicated by the link destination identification information, by the still image reproduction or the motion picture reproduction, instead of or in addition to the motion picture content, if it is determined that at least the part is included by said determining device.

According to the interface apparatus for the viewer in the present invention, it is possible to jump the motion picture content while being reproduced to the desired link destination on the viewer side, by using the position information and the link destination identification information, which are data for designating the link destination. In particular, an object can be accurately or certainly selected, regardless of specifications, standards, attributes, aspect ratio setting, magnification setting, and presence or absence of segmentation of the reproducing device used when an operation of selecting the object in the motion picture content is performed by selecting the position or area on the screen (i.e. the reproducing device having the "screen" according to embodiments or the present invention) on the viewer side.

The above object of the present invention can be achieved by a fourth computer program according to the present invention for making a computer function as the interface apparatus for the viewer according to the present invention.

According to the fourth computer program in the present invention, the interface apparatus for the viewer according to the present invention described above can be relatively easily realized as a computer system reads and executes the computer program from a recording medium for storing the computer program, or as the computer system executes the computer program after downloading the program through a communication device.

The operation and other advantages of the present invention will become more apparent from embodiments explained below.

DESCRIPTION OF EMBODIMENTS

<Interface Apparatus for Designating a Link Destination>
<1>

An interface apparatus for designating a link destination, comprises: a range designating device configured to designate a desired range in a screen on which motion picture content is reproduced by still image reproduction or motion picture reproduction; a range mark setting device configured to superimpose and display a range mark indicating the range designated by said range designating device, on the motion picture content in the screen; a movement operating device configured to move the range mark in a desired direction, along with a lapse of reproduction time of the motion picture content in the screen on which the motion picture content is reproduced by the motion picture reproduction; a link destination inputting device configured to input link destination identification information for identifying a desired link destination as what corresponds to the range mark; and a holding device configured to hold position information indicating a position of the range mark, in association with (i) the link destination identification information inputted by said link destination inputting device and (ii) each time point in the reproduction time.

According to the interface apparatus for designating a link destination in the embodiment, it operates as follows on a user side of the apparatus, who is a person on a content provider side such as, for example, an advertiser staff, an advertising agency staff, and a broadcast station staff. The "content provider" is typically a person who plans to provide content, which is to be a link destination, or who plans to introduce a viewer to the link destination, and may be or may not be the same as a provider who provides the motion picture content itself. The "object" according to embodiments or the present invention means a visible tangible thing such as, for example, beverage/food, containers for beverage/food, cloths, ornaments, vehicles, furniture, and electrical appliances, displayed in a form of being included in the motion picture content. In a broad sense, a part that can be distinguished from another part in the motion picture content so that the link destination can be designated as explained below corresponds to the "object" according to embodiments or the present invention, even though its shape and outline are not clear. In a narrow sense, the "object" is an article that is displayed as a part of the motion picture content and that is associated with the link destination. The interface apparatus for designating the link destination functions as a so-called graphical user interface (GUI) for the user or the content provider.

Firstly the motion picture content that is a target to set up a link is reproduced by the still image reproduction or the motion picture reproduction on the screen of a displaying device provided for, for example, a personal computer, a touch panel, a mobile device, a portable terminal device, a smartphone, a mobile or cell phone, a high-performance television, or the like (i.e. a displaying device, a display, or the like, having the "screen" according to embodiments or the present invention). The motion picture content is arbitrary, such as movies, dramas, animations, documentaries, variety shows, television shopping, and sports programs. In other words, the motion picture content is not necessarily content produced to set up a link, but may be general content. It may be motion picture content configured to set up, to easily set up, or to be able to set up a link.

In this state, in the screen, the desired range is designated by the user of the apparatus via the range designating device. Before or after, simultaneously with, or in parallel with this, the range mark indicating the designated range is superimposed and displayed on the motion picture content in the screen by the range mark setting device. The range mark may be a red-line square or polygonal outline mark, or may be a circular outline mark. Alternatively, the range mark may be a mark written by a fluorescent pen or by hatching, and it may be arbitrary as long as the range mark can be visually recognized on the screen. The range mark is preferably bordered with an outline thereof in a sense of providing the "range" used as a reference to determine whether or not to jump the motion picture content to the link destination as described later. However, under such a rule that "it has a range with a certain size and a certain shape in its surroundings", which is used as the reference to determine whether or not to jump the motion picture content to the link destination, the range mark may be simply a dot-shape mark or a predetermined type of icon, which indicates a center of the range or the like.

For the "range designating device" according to embodiments or the present invention, various existing operating apparatuses may be adopted such as, for example, a mouse, a tablet, a jog dial, a trackball, a keyboard, and a touch panel that can perform an icon operation, a drawing operation, a display operation, and similar operations in the screen. The "range mark setting device" according to embodiments or the present invention may include a part or all of various existing display control apparatuses such as, for example, a CPU, a microcomputer, a memory and the like. The range mark setting device is capable of display-controlling a display device, which is configured separately from or built in the range mark setting device (i.e. a displaying device having the "screen" according to embodiments or the present invention), by providing various signals to the display device corresponding to an image to be displayed, such as an image signal, an image control signal, a timing signal, and a synchronization signal.

As described above, initial setting of the range mark in the screen is performed. The still image reproduction, stop motion, or slow reproduction of the motion picture content is preferably performed at this stage from the viewpoint that the initial setting is accurately or certainly performed as for the shape and size of the range mark, a position relation with the object to be linked, or the like. However, if there is poor, little, or no movement of the motion picture content, or particularly of the object included therein, which is reproduced by the motion picture reproduction, or if an operation skill of the user of the apparatus is high and the user can operate quickly, or in similar cases, the initial setting may be performed during motion picture reproduction such as during slow reproduction, during normal reproduction, and during high-speed reproduction.

Then, the motion picture content is reproduced by the motion picture reproduction, while the range mark that is subject to the initial setting as described above is superimposed on the motion picture content. The motion picture reproduction may be high-speed reproduction such as double speed reproduction, or low-speed reproduction such as slow reproduction, or normal reproduction, variable reproduction, or frame feed.

In this state, in the screen, the range mark is moved in the desired direction along with the lapse of the reproduction time of the motion picture content by the movement operating device. Typically, the range mark is moved at an arbitrary speed, continuously or discontinuously, freely in a two-dimensional surface of the screen. During the movement, one or a plurality of stops may be included.

As the "movement operating device" according to embodiments or the present invention, various existing operating apparatuses such as, for example, a mouse, a tablet, a jog dial, a trackball, a keyboard, a touch panel and so forth, that can perform an icon operation in the screen, may be adopted. Typically, the range mark may be moved in the screen in a manner of moving an icon in the screen.

Before or after, simultaneously with, or in parallel with the designating operation by the range designating device and the setting operation by the range mark setting device described above, the link destination identification information for identifying the desired link destination is inputted via the link destination inputting device as what corresponds to the range mark described above. The "link destination inputting device" according to embodiments or the present invention is an inputting device such as, for example, a keyboard, a tablet, a touch panel, a mouse and the like, for inputting the link destination identification information (e.g. address information of the link destination). The "link destination" is arbitrary as long as it is a provision source of an image that can be displayed somehow in the screen (specifically by segmentation display or window display) instead of or in addition to the motion picture content that is being watched, such as a provision source of another motion picture content, a provision source of another still image content, an Internet site, a motion picture distribution site, and a music distribution site, in an environment in which the viewer watches the motion picture content. In any case, such a provision source can be identified by the link destination identification information.

Then, the position information indicating the position of the range mark, which is moved in the above manner, is held in the holding device, which is provided, for example, with a memory, a storage apparatus, a controller, and the like. The storage here may be performed away from where the user of the apparatus operates, via a communication device. In other words, at least a part of the holding device may be at remote locations.

At this time, in particular, the position information is held correspondingly to the link destination identification information and each time point in the reproduction time. Here, "each time point" includes both (i) a case where it is continuously or regularly with a regular period of one to one or many to one with respect to an image frame that constitutes the motion picture content, and (ii) a case where it is discontinuously, irregularly, or with an irregular period with respect to the image frame that constitutes the motion picture content. In particular, "each time point" includes a case where the position information is held less frequently and one position information is held for a period in which the range mark is not moved, while the range mark is not moved. Alternatively, "each time point" includes a case where the position information is held more frequently and one position information is held at each time when the range mark is moved (i.e. unchanged one position information is held while the range mark is not moved), while the range mark is moved.

As described above, in terms of the "position of the range mark (i.e. the position information)", it is associated with a reproduction time point without being associated with the corresponding object on the apparatus.

Moreover, in terms of the "link destination (e.g., the link destination identification information)" as described above, it is associated with the range mark without being associated with the corresponding object on the apparatus.

Here, in general, in case that a link is set up for an arbitrary object in motion picture data, advanced data processing such as image analysis and image recognition is required if it is tried to be associated with the content itself of the motion picture content, or the content or position itself of the object in the motion picture content. Therefore, a necessary program becomes complicated and advanced, and a processing time, a processing amount, and a data amount remarkably increase.

According to the embodiment, however, it is only necessary for the user of the apparatus to perform a simple manual operation or the like via the movement operating device while watching the motion picture content and the range mark with the user's eyes, and the position information obtained by that may be held in the holding device in association with a reproduction time axis. Before or after, simultaneously with, or in parallel with this, the link destination is associated with the range mark. Therefore, on the user side of the apparatus, it is possible to easily set up a link. In particular, the link destination is not necessarily directly associated with the content itself of the motion picture content, or the content or position itself of the object. Moreover, it can be performed in simple processes of designating the range and moving the range mark, or in a form that is even visually easy to understand.

As a result, according to the embodiment, regarding the designation of the link destination by the user of the apparatus, specialty such as computer program knowledge or system engineer knowledge is not required. It is easy to designate the link destination or establish data for designating the link designation, independently of the content, the movement complexity, and speed of the motion picture content on the apparatus, by adopting the setting of the range mark, the moving operation and the like.

On the other hand, the motion picture content itself that is a target to set up a link is not particularly limited, and is arbitrary as long as the user of the apparatus can perform the setting of the range mark and the moving operation for the range mark in the screen while watching the motion picture content. The motion picture content is not necessarily exclusive motion picture content established to be able to designate the link destination in advance.

As described above, according to the embodiment, the operation of designating the desired link destination can be easily performed on arbitrary motion picture content on the user side of the apparatus (i.e. on the content provider side). In particular, it is common practice to frequently change, add, or delete the link destination to be designated by the user of the apparatus, due to speedup of a merchandise cycle. Even under the environment in which it is highly desired to simply designate, change, or add the link destination or perform similar actions, it is possible to simply designate, set, change, or add the desired link destination or perform similar actions, resultantly for an arbitrary object. Moreover, the program required to realize the interface apparatus for designating the link destination is simple, and the processing time, the processing amount, and the data amount can be remarkably reduced.

<2>

In one aspect of the interface apparatus for designating the link destination according to the embodiment, the holding device holds, as the position information, position information indicating a relative position of the range mark with respect to an entire image area of the motion picture content.

According to this aspect, the "position of the range mark (or the position information)" is set to be neither (i) a position with respect to the screen in which the range mark is actually displayed on the displaying device nor (ii) a position in the screen, but is set to be a relative position with respect to the entire image area of the motion picture content displayed in the screen at each time point (i.e. the entire image area including an image part that is not visible in the screen), on the apparatus.

Thus, the holding device holds the position information indicating the position or coordinates of the range mark that is not associated with the corresponding object on the apparatus, regardless of the "position in the screen", or more specifically, regardless of the "position in the display screen that is actually displayed on the displaying device". Therefore, the link destination can be accurately or certainly designated, regardless of specifications, standards, attributes, aspect ratio setting, magnification setting, and presence or absence of segmentation of the displaying device used when the operation of designating the link destination is performed on the user side of the apparatus.

Moreover, the object can be accurately or certainly selected, regardless of the specifications, standards, attributes, aspect ratio setting, magnification setting, and presence or absence of segmentation of the displaying device (or the reproducing device) used when the operation of selecting the object in the motion picture content is performed later by selecting the position or area on the screen on the viewer side.

Particularly according to the studies by the present inventors, even for the same content, it is important to realize the mechanism for associating the link destination as described above, by using the displaying device (or the reproducing device) that has various aspect ratios, variable lateral magnification and longitudinal magnification, and different segments and that is provided for a wide or normal, and large or small television, a personal computer, a mobile device, a smart phone, a mobile or cell phone, or the like.

Here, there is no problem if the "entire image area of the motion picture content" is displayed without excess or deficiency on the "screen" of the displaying device (or the reproducing device) used by the user of the apparatus or the viewer. However, it is rather rare to be displayed in such a manner due to the appearance of various types of displaying devices or reproducing devices as described above. Specifically, for example, there is also a case where "the entire image area of the motion picture content>the size of the screen" (e.g., a case where only a part of the motion picture content is displayed in the screen). There is also a case where "the entire image area of the motion picture content<the size of the screen" (e.g., a case where the motion picture content is displayed only in a part of the screen). There is also a case where the motion picture content is expanded in a longitudinal direction and lateral direction, and a part or all of a longitudinally long image, a laterally long image, or an expanded image is displayed in the screen.

According to the embodiment, however, the operation of designating the desired link destination can be easily performed so as to be able to respond to the displaying device (or the reproducing device) having various screens that may be used by the user of the apparatus. Moreover, even if the link destination is simply designated as described above, as long as the setting of the range mark and the moving operation are appropriately performed, there is no deviation between the object displayed in the motion picture content and the link destination that should correspond to the object, regardless of the type of the displaying device (or the reproducing device) having the "screen" that may be used on the viewer side.

The position of the range mark (or the position information) is preferably, but is not necessarily, a relative position of the motion picture content to the entire image area as described above. For example, it may be a relative position with respect to an entire area of the screen of a displaying device, a display, or the like, provided for the reproducing device. In this case, the position information may be generated and held differently for specifications, standards and the like of the displaying apparatus or the reproducing apparatus, and the position information may be used later differently for specifications, standards and the like, on the interface apparatus for the viewer. Alternatively, a parameter indicating the specification, standard and the like of the displaying apparatus or the reproducing apparatus may be generated and held in association with the position information, and position adjustment according to the parameter may be performed later regarding a selected display position or area on the interface apparatus for the viewer.

<3>

In this aspect, the holding device may hold, as the position information, position information indicating a relative position of the range mark with respect to one of a field of view, at least one of four corners, an outer profile and a reference position fixed in the entire image area, associated with the entire image area.

By virtue of such a configuration, as the position information, the position information indicating the relative position of the range mark with respect to the entire image area is held on the holding device. Typically, xy coordinates when the four corners of the entire image area of the motion picture are set to (0,0), (1,0), (1,1), and (0,1) is held as the position information.

Therefore, by using the position information, the object can be accurately or certainly selected, regardless of the specification, standard, and the like of the displaying device (or the reproducing device) used later when the operation of selecting the object on the motion picture is performed on the viewer side.

<4>

In another aspect of the interface apparatus for designating the link destination according to the embodiment, the holding device holds the position information at each time point while the range mark is moved, and does not hold the position information at each time point while the range mark is not moved.

According to this aspect, if the range mark is moved, the holding device holds a plurality of position information for a plurality of frames respectively while the range mark is moved. On the other hand, if the range mark is not moved, the holding device holds one or n position information (n is a natural number), which is less than m (m is a natural number) for a plurality of m frames while the range mark is not moved.

Therefore, it is possible to establish the mechanism for selecting the link destination on the motion picture content on the viewer side, by using a much smaller amount of data in comparison with the case where various data for link destination is established for each frame of the motion picture content as performed in the background art, which is extremely useful in practice.

The holding device may hold the position information at all the time points of the reproduction time, i.e. for each frame. In this case, it is similar to a case where the holding device records a motion picture (i.e. motion picture data that allows reproduction of a moving image in the range mark, which moves, stops and moves, or disappears and appears, in a background screen, along with a lapse of time) which is different from the motion picture content, in the same reproduction time as that of the motion picture content.

<5>

In another aspect of the interface apparatus for designating the link destination according to the embodiment, the link destination inputting device is configured to input a plurality of link destination identification information as what respectively correspond to a plurality of objects in the motion picture content, and the holding device holds, as the position information, a plurality of position information in association with the plurality of link destination identification information.

According to this aspect, an environment in which a plurality of link destinations can be selected in one motion picture content later on the viewer side can be simply established on the user side of the apparatus.

<6>

In another aspect of the interface apparatus for designating the link destination according to the embodiment, the link destination inputting device is configured to input a plurality of link destination identification information associated with a plurality of link destinations depending on distinction between a plurality of types of operations, or instead thereof or in addition thereto, said link destination inputting device is configured to input the destination identification information while being able to select a plurality of display forms associated with the link destination depending on distinction between a plurality of types of operations.

According to this aspect, via the link destination inputting device, the link destination identification information is inputted while the plurality of display forms associated with the link destinations are able to be distinctively selected, depending on the distinction between the plurality of types of input operations including, for example, a touch operation, a tap operation, a long pressing operation, a swipe operation, a drag operation, a slide operation, a rotation operation, a zoom operation, a pinch operation, a stretch operation, a flick operation, and the like. Alternatively, instead thereof or in addition thereto, the link destination identification information that allows the selection of the plurality of link destinations is inputted.

It is therefore possible to simply establish, on the user side of the apparatus, the environment in which the content of the link destination can be displayed in different forms or in which the content of the different link destinations can be displayed, by performing the different types of input operations on one object later on the viewer side.

<7>

In another aspect of the interface apparatus for designating the link destination according to the embodiment, the range designating device is configured to designate the desired range by using a frame that has a predetermined shape and that is freely extendable in the screen, in response to a predetermined type of designating operation, and the movement operating device is configured to move a frame mark indicating the frame as the range mark, in the screen.

According to this aspect, as the predetermined type of designating operation is performed via the range designating device, the range mark, which is, for example, rectangular, polygonal, circular, oval or the like, is extendably-and-shirinkably displayed by the range mark setting device. It is thus possible to simply designate an appropriate-size range while visually confirming the motion picture content and the frame mark superimposed thereon in the screen on the user side of the apparatus. Then, the frame mark indicating the appropriate-size range is moved via the movement operating device, so that it is thus possible to certainly perform the moving operation while visually confirming the movement operation.

<8>

In this aspect, the range designating device may be configured to designate the desired range by extending or shrinking four corners of a rectangular frame displayed in the screen, and the movement operating device may be configured to move the frame mark indicating the rectangular frame as the range mark, in the screen.

By virtue of such a configuration, as the predetermined type of designating operation is performed via the range designating device, the rectangular frame mark is displayed in such a manner that the four corners are freely extendable-and-shrinkable. Here, the expression "extending or shrinking the four corners of the rectangular frame" means that the four corners are extended or shrinked relatively to the entire image area, and includes not only a case where all the four coordinates of the four corners are changed, but also, for example, a case where two corners are moved with respect to the entire image area while the other two corners are fixed with respect to the entire image area, or a case where three corners are moved with respect to the entire image area while the other one is fixed with respect to the entire image area. It is thus possible to designate the appropriate-size range, extremely simply, while visually confirming the motion picture content and the frame mark superimposed thereon in which size setting is completed, in the screen on the user side of the apparatus.

Particularly, in the case of the rectangular frame mark, the position and size thereof can be indicated, for example, by two coordinates, which are upper left corner coordinates and lower right corner coordinates, and an operation of changing the two coordinates is an operation of extendably-and-shrinkably displaying the rectangular frame. In other words, the frame mark is freely extendible-and-shrinkable in a simple operation. A coordinate axis at this time is based on the four corners of the entire image area of the motion picture content, regardless of the screen of the displaying device (or the reproducing device) as described above.

<9>

In another aspect of the interface apparatus for designating the link destination according to the embodiment, the screen is a screen of a touch panel, and the movement operating device uses a contact with said touch panel by an operator as a trigger to start movement of the range mark, and uses an end of the contact as a trigger to end the movement of the range mark.

According to this aspect, the operation performed by the user of the apparatus (i.e. the operator of the "touch panel" here) from the start of the movement to the end of the movement of the range mark can be further simplified. As a whole, the operation of moving the range mark can be performed, more simply and quickly.

The contact with the touch panel by the operator may be used as a trigger when starting an operation of designating the range via the designated range. In that case, it may be further configured in such a manner that operations until the end of the movement of the range mark may be performed as a series of contact operations while the operator does not release the contact with the touch panel.

<Computer Program for Interface Apparatus for Designating a Link Destination>

<10>

A first computer program according to an embodiment makes a computer function as the interface apparatus for designating the link destination according to the embodiment described above (including its various aspects).

According to the computer program in the embodiment, the interface apparatus for designating the link destination according to the embodiment described above (including its various aspects) can be relatively easily realized as a computer system reads and executes the computer program from a solid-state storage apparatus, which can be detached from or attached to the computer system, such as a universal serial bus (USB) memory or a recording medium like a ROM, a CD-ROM, a DVD-ROM, a hard disk, and the like, for storing the computer program, or as the computer system executes the computer program after downloading the program through a communication device.

<Interface Apparatus for a Viewer>

<11>

A first interface apparatus for a viewer according to an embodiment is an interface apparatus for a viewer, for controlling a reproducing device to selectively perform a reproduction of content of a link destination, instead of or in addition to reproduction of motion picture content, during the reproduction of the motion picture content performed by a reproducing device, on the basis of the position information and the link destination identification information generated by the interface apparatus for designating the link destination according to the embodiment described above (including its various aspects), the interface apparatus for the viewer provided with: a position selecting device configured to select a desired display position or area in the screen in which the motion picture content is reproduced by still image reproduction or motion picture reproduction; a determining device configured to determine whether or not at least a part of the display position or area selected by the position selecting device is included in the range indicated by the range mark determined from the position of the range mark indicated by the position information; and a link destination controlling device configured to control the reproducing device to reproduce the content of the link destination indicated by the link destination identification information, by the still image reproduction or the motion picture reproduction, instead of or in addition to the motion picture content, if it is determined that at least the part is included by said determining device.

According to the first interface apparatus for the viewer in the embodiment, the desired display position or area is selected via the position selecting device, in the screen in which the motion picture content is reproduced by the still image reproduction or the motion picture reproduction, by the reproducing device having the "screen" according to embodiments or the present invention, on the viewer side (i.e. on a user side of the apparatus). The "reproducing device" according to embodiments or the present invention is one of various existing apparatuses with a display function, each of which has a display screen and each of which is configured to reproduce and display the motion picture content on the screen. The reproducing device may be built in a personal computer, a tablet, a smart phone, a mobile device, a mobile or cell phone, or the like, and is not particularly limited. In addition to the display function, an audio output function may be also provided.

Regarding the position selection, more specifically, the display position or display area is selected, which is a part of or near the object in the motion picture content recognized by the viewer, by a click operation, an icon operation, or similar operations performed by a tablet, a mouse, a touch panel, a remote controller, a keyboard, and the like, which constitute the "position selecting device" owned by the viewer.

In addition, a special mark or special display indicating that the link destination exists as what corresponds to a certain object may be or may not be separately displayed, in a form of being superimposed on or adjacent to the object in the screen, or at a predetermined position in the screen.

If the display position or display area is selected via the position selecting device in the screen as described above, it is determined by the determining device, which is provided with a controller, a CPU, a memory, and the like, whether or not at least a part of the selected display position or display area is included in the range indicated by the range mark set in advance.

The range indicated by the range mark is determined from the position and shape of the range mark indicated by the position information held by the holding device in advance.

The position of the range mark is preferably, but is not necessarily, a relative position of the motion picture content to the entire image area. For example, it may a relative position with respect to an entire area of the screen of the displaying device, the display, or the like, provided for the reproducing device. In this case, the position information may be generated and held differently for specifications, standards, and the like of the displaying apparatus or the reproducing apparatus on the interface apparatus for designating the link destination in advance, and the position information may be used later differently for specifications, standards, and the like, on the interface apparatus for the viewer. Alternatively, a parameter indicating the specifications, standards, and the like of the displaying apparatus or the reproducing apparatus may be generated and held in association with the position information, on the interface apparatus for designating the link destination in advance, and the position adjustment according to the parameter may be performed later regarding the selected display position or area on the interface apparatus for the viewer.

As a result of the determination by the determining device, if it is determined that at last the part is included, the content of the link destination is reproduced by the still image reproduction or the motion picture reproduction, instead of or in addition to the motion picture content, by the reproducing device including, for example, the displaying device, the display, an audio output device, or the like, under control by the link destination controlling device, which is provided with a controller, a CPU, a memory, and the like. The link destination here is identified or indicated by the link destination identification information corresponding to the aforementioned position information (i.e. corresponding to the range mark).

Therefore, if the viewer selects the vicinity of the object or the like recognized with the viewer's own view on the screen, it is possible to reproduce the content of the link destination corresponding to the range mark, in other words, to jump to the link destination. At this time, the range mark is associated with the desired link destination via the link destination identification information and the position information. Thus, it is possible to jump to the link destination, that was intended or designed to correspond to the object on the content provider side, i.e. the desired link destination.

As a result, according to the first interface apparatus for the viewer in the embodiment, it is possible to jump the motion picture content to the desired link destination during reproduction on the viewer side, by using the position information and the link destination identification information, which are data for designating the link destination prepared by the interface apparatus for designating the link destination according to the embodiment

<12>

A second interface apparatus for a viewer according to an embodiment is an interface apparatus for a viewer, for controlling a reproducing device to selectively perform a reproduction of content of a link destination, instead of or in addition to a reproduction of motion picture content, during the reproduction of the motion picture content, on the basis of (i) position information indicating a relative position of a desired range in a screen of the motion picture content with respect to an entire image area of the motion picture content in association with each time point in a reproduction time of the motion picture content, and (ii) link destination identification information for identifying a desired link destination as what corresponds to the desired range, said interface apparatus for the viewer comprising: a position selecting device configured to select a desired display position or area in the screen in which the motion picture content is reproduced by still image reproduction or motion picture reproduction; a determining device configured to determine whether or not at least a part of the display position or area selected by said position selecting device is included in the desired range determined from the relative position indicated by the position information; and a link destination controlling device configured to control said reproducing device to reproduce the content of the link destination indicated by the link destination identification information, by the still image reproduction or the motion picture reproduction, instead of or in addition to the motion picture content, if it is determined that at least the part is included by said determining device.

According to the second interface apparatus for the viewer in the embodiment, it operates in substantially the same manner as in the first interface apparatus for the viewer in the embodiment described above.

Particularly, in the second interface apparatus for the viewer in the embodiment, for example, the "desired range", which is indicated by the range mark if the "range mark" described above is adopted, is determined from the position information held by the holding device in advance. The position indicated by the position information is a relative position with respect to the entire image area of the motion picture content.

In other words, the "position of the desired range (or position information)" is considered to be not a position with respect to the screen in which the desired range is actually displayed on the displaying device or a position in the screen, but a relative position with respect to the entire image area of the motion picture content displayed in the screen at each time point (i.e. the entire image area including an image part that may not be visible in the screen), on the apparatus.

Therefore, the object can be accurately or certainly selected by selecting the position or area on the screen on the viewer side, regardless of the specifications, standards, attributes, aspect ratio setting, magnification setting, and presence or absence of segmentation of the reproducing device (or the reproducing device having the "screen" according to embodiments or the present invention) used when the operation of selecting the object in the motion picture content is performed.

Particularly according to the studies by the present inventors, even for the same content, it is complicated and hard, according to the background art, to realize such a mechanism for associating the link destination, on the reproducing device or the displaying device (i) that has various aspect ratios, variable lateral magnification and longitudinal magnification, and different segments and (ii) that is provided for a wide or normal, and large or small television, a personal computer, a mobile device, a smart phone, a mobile or cell phone, or the like. Alternatively, according to the background art, in order to respond to such various types of reproducing devices or displaying devices, there is a need to perform a complicated operation of associating the link destination, depending on the types of the reproducing devices or display devices.

According to the embodiment, however, as long as the setting of the desired range and the moving operation or the like, which are, for example, the setting and the moving operation of the range mark indicating the "desired range" or the like, are appropriately performed, there is no deviation between the object displayed in the motion picture content and the link destination that should correspond to the object, regardless of the type of the reproducing device used on the viewer side. Considering that the specifications, standards, types, and the like of the reproducing device are rapidly advancing, it is extremely useful in practice that various reproducing devices can be coped with, simply or without change.

As a result, according to the second interface apparatus for the viewer in the embodiment, it is possible to jump the motion picture content to the desired link destination during reproduction on the viewer side, by using the position information and the link destination identification information, which is data for designating the link destination.

<13>

In one aspect of the second interface apparatus for the viewer according to the embodiment, the position information indicates a relative position of a range mark, which indicates the desired range, with respect to the entire image area by using the coordinates, the link destination identification information identifies the desired link destination as what corresponds to the range mark, and said determining device determines whether or not at least the part is included in a range indicated by the range mark determined from the relative position indicated by the position information.

According to this aspect, by adopting the "range mark" indicating the "desired range" as in the case of the first interface apparatus for the viewer described above, it is possible to jump the motion picture content during its reproduction to the desired link destination on the viewer side, by using the position information and the link destination identification information, while improving efficiency and operability of each process and preventing a data mount from being enlarged, at the stage of designating the link destination on the content provider side or the like and at the stage of selecting the link destination on the viewer side.

<14>

In another aspect of the second interface apparatus for the viewer according to the embodiment,
the position information indicates a relative position of the desired range with respect to one of a field of view, at least one of four corners, an outer profile and a reference position fixed in the entire image area, associated with the entire image area.

According to this aspect, the position information indicates, for example, the relative position of the range mark indicating the "desired range" with respect to the entire image area. Typically, the position information indicates xy coordinates when the four corners of the entire image area of the motion picture are set to (0,0), (1,0), (1,1), and (0,1).

Therefore, the object can be accurately or certainly selected, regardless of the specifications, standards, and the like of the reproducing device used when the operation of selecting the object on the motion picture is performed by selecting the position or area. This certainly prevents such a disadvantage that the content of the link destination related to a different object from the selected object is displayed.

<15>

In another aspect of the second interface apparatus for the viewer according to the embodiment, the link destination identification information is configured to identify a plurality of link destination identification information associated with a plurality of link destinations depending on distinction between a plurality of types of input operations, or instead thereof or in addition thereto, the link destination identification information is configured to identify a plurality of display forms associated with the link destinations depending on the distinction between a plurality of types of input operations, said determining device determines whether or not at least the part is included, and determines the distinction between the plurality of types of input operations, and said link destination controlling device controls the reproducing device to reproduce the content of the link destination indicated by the link destination identification information, by the still image reproduction or the motion picture reproduction, instead of or in addition to the motion picture content, depending on the distinction between the plurality of types of input operations determined by said determining device.

According to this aspect, the content of the link destination is reproduced by the still image reproduction or the motion picture reproduction, instead of or in addition to the motion picture content, depending on the distinction between the plurality of types of input operations, for example, including at least one of a touch operation, a tap operation, a long pressing operation, a swipe operation, a slide operation, a drag operation, a rotation operation, a zoom operation, a pinch operation, a stretch operation, a flick operation, and the like. At this time, even if the same position or area is selected, the reproduction control may be performed in such a manner that the link destinations may be different from each other, according to the distinction between the plurality of types of input operations. Alternatively, even if the same position or area is selected, the reproduction control may be performed in such a manner that the same link destination may have different display forms, according to the distinction between the plurality of types of input operations.

As described above, the content of the different link destinations can be displayed, or the content of the link destination can be displayed in different forms, by performing the different types of input operations on the same object on the viewer side.

<16>

In another aspect of the first or second interface apparatus for the viewer according to the embodiment, the determining device determines whether or not at least the part is included, regarding each time point in the reproduction time with which the position information is associated.

According to this aspect, it is determined by the determining device whether or not at least a part of the display position or display area selected in the screen is included in the range indicated by the range mark, regarding each time point in the reproduction time with which the position information is associated.

Here, "each time point" includes both (i) the case where it is continuously or regularly with a regular period of one to one or many to one with respect to an image frame that constitutes the motion picture content, and (ii) the case where it is discontinuously or irregularly with an irregular period with respect to the image frame that constitutes the motion picture content. In particular, while the range indicated by the range mark determined from the position information (specifically, from temporal or spatial behavior of an electrical signal, which is a basis for the position information, such as a change in values at each position, generation frequency, and a generation time point) is not moved, "each time point" also includes the case where the determination is performed less frequently and one determination operation is performed for the period in which the range is not moved. Alternatively, while the range indicated by the range mark determined from the position information is moved, "each time point" also includes the case where the determination is performed more frequently and one determination operation is performed at each time that the range is moved (i.e. one determination operation having the same determination result while the range is not moved).

In any case, once the motion picture content is jumped to the content of the link destination according to the selection of the display position or display area, the determination by the determining device is not necessarily performed regarding the motion picture content after the jump.

<17>

In another aspect of the first or second interface apparatus for the viewer according to the embodiment, the link destination controlling device controls the reproducing device to change the motion picture content to the content of the link destination and reproduce the content of the link destination if it is determined at least the part is included, and the link destination controlling device controls the reproducing device to reproduce the motion picture content at a changing time point of the motion picture content if the reproduction of the content of the link destination is ended.

According to this aspect, after the motion picture content is jumped to the link destination and if the reproduction of the link destination is completed, the motion picture content before jumping to the link destination is reproduced again from the jumping position. Thus, for example, if the motion picture content that has a series of meanings, such as, for example, a movie and a drama, is reproduced, the viewer can watch the motion picture content without excess or deficiency with just watching the content of the link destination in the middle of the reproduction of the motion picture content, which is useful.

If the content of the link destination is reproduced by window display in the motion picture content that is being watched, the motion picture content can keep being reproduced while the content of the link destination is reproduced.

<Computer Program for Interface Apparatus for a Viewer>

<18>

A second computer program according to an embodiment makes a computer function as the first or second interface apparatus for the viewer according to embodiments described above (including its various aspects).

According to the second computer program in the embodiment, the first or second interface apparatus for the viewer according to embodiments described above (including its various aspects) can be relatively easily realized as a computer system reads and executes the computer program from a solid-state storage apparatus, which can be detached from or attached to the computer system, such as a universal serial bus (USB) memory or a recording medium like a ROM, a CD-ROM, a DVD-ROM, a hard disk, and the like, for storing the computer program, or as the computer system executes the computer program after downloading the program through a communication device.

<Recording Medium>

On a recording medium according to an embodiment, the first or second computer program according to embodiments described above is recorded.

According to the recording medium in the embodiment, the interface apparatus for designating the link destination and the first and second interface apparatuses for the viewer according to embodiments described above can be relatively easily realized as the computer system reads and executes the first or second computer program according to embodiments recorded, by installing or connecting the recording medium to the computer system, or by inserting the recording medium to a proper reading apparatus provided for or connected to the computer system.

The operation and other advantages of the embodiments will become more apparent from an example explained below.

BRIEF DESCRIPTION OF DRAWINGS

FIG. 3 is a conceptual diagram illustrating a structure of data for designating the link destination, generated by a link destination designating operation and used on the interface apparatus for the viewer according to the example.

EXAMPLE

Firstly, with reference to a block diagram in FIG. 1, a basic configuration of an interface apparatus for designating a link destination according to an example will be explained. This apparatus is used as a graphical user interface by a user of the apparatus, who is a person on a motion picture content provider side, such as an advertiser staff, an advertising agency staff, a broadcast station staff and so forth.

Figure 1:
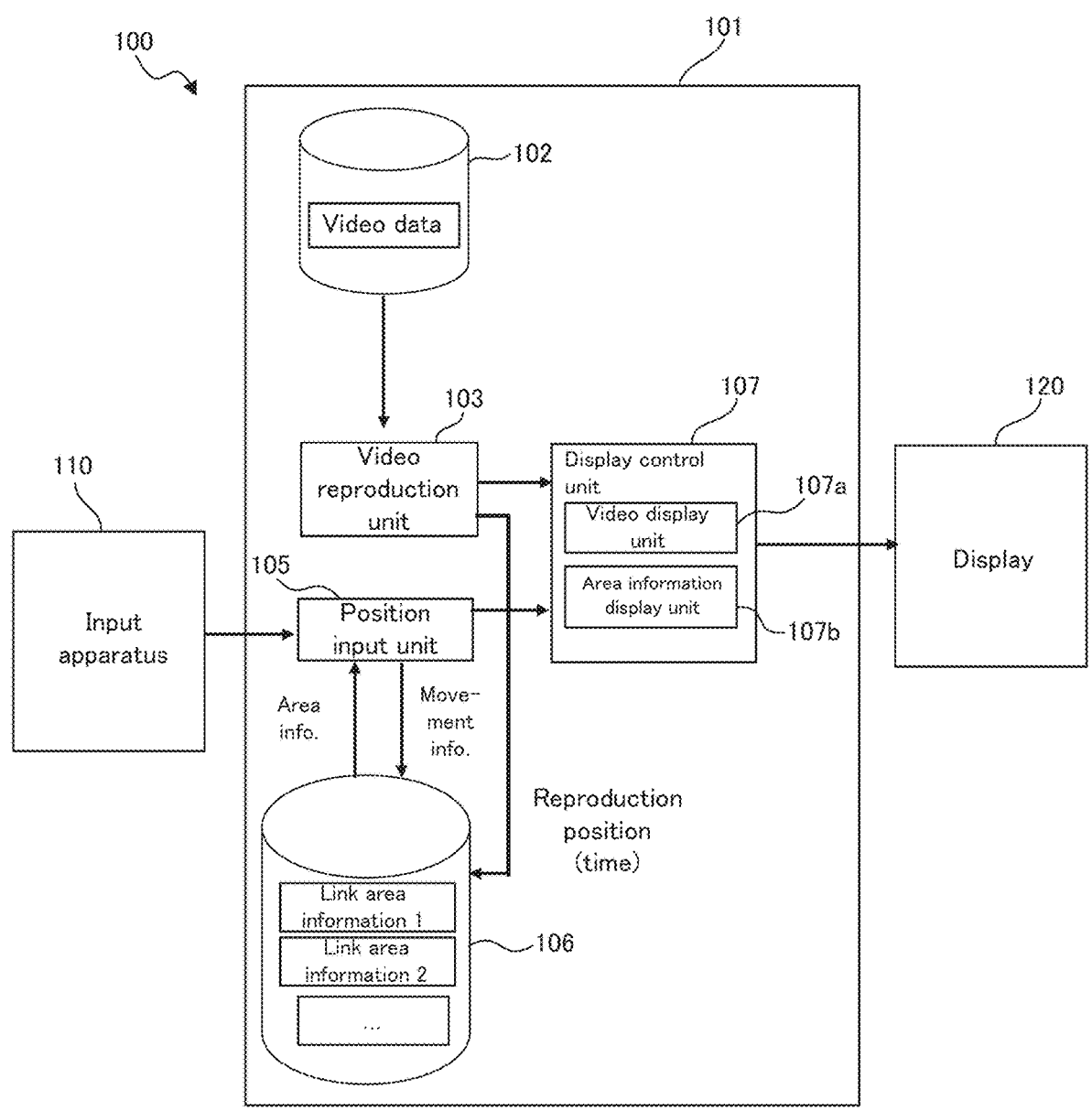
FIG. 1 is a block diagram illustrating an interface apparatus for designating a link destination according to an example.

In FIG. 1, an interface apparatus 100 for designating a link destination is provided with a motion picture reproducing apparatus 101 with a link designation function, an input apparatus 110, and a display 120.

The input apparatus 110 has, for example, a touch panel, a mouse, or the like. The display 120 has, for example, a display of a personal computer, a smart phone, a tablet, or the like, and may be integrally with or separately from the input apparatus 110 or the motion picture reproducing apparatus 101.

The motion picture reproducing apparatus 101 is provided with a storage apparatus 102 configured to store therein video data, a video reproduction unit 103 configured to reproduce the video data from the storage apparatus 102, a position input unit 105 configured to input data or the like associated with a position via the input apparatus 110, a storage apparatus 106 configured to store therein link area information 1, 2, 3 and so on, and a display control unit 107 including (i) a video display unit 107a configured to control the display of the video data on the display 120 and (ii) an area information display unit 107b configured to control the display of a range mark on the display 120 on the basis of the link area information.

In the example, one example of the "range designating device" according to embodiments or the present invention is constructed to include the input apparatus 110 and the position input unit 105. One example of the "range mark setting device" according to embodiments or the present invention is constructed to include an area information display unit 107b. One example of the "movement operating device" according to embodiments or the present invention is constructed to include the input apparatus 110, the position input unit 105, and the area information display unit 107b. One example of the "link destination designating device" according to embodiments or the present invention is constructed to include the input apparatus 110. One example of the "holding device" according to embodiments or the present invention is constructed to include the storage apparatus 106.

Next, with reference to a block diagram in FIG. 2, a basic configuration of an interface apparatus for a viewer according to the example will be explained. This apparatus is used as a graphical user interface by a user of the apparatus, who is a viewer that views motion picture content.

Figure 2:
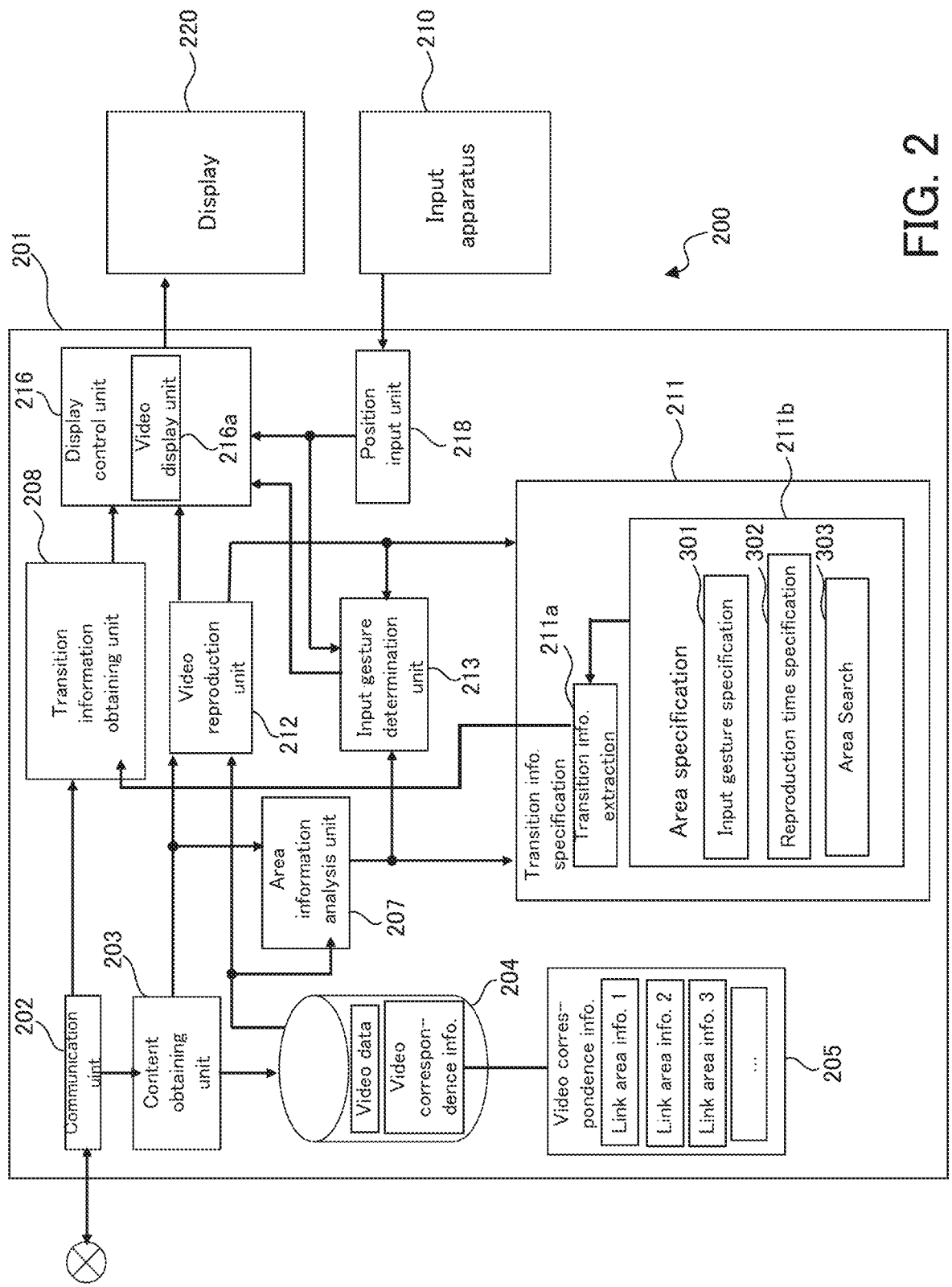
FIG. 2 is a block diagram illustrating an interface apparatus for a viewer according to the example.

In FIG. 2, an interface apparatus 200 for a viewer is provided with a motion picture reproducing apparatus 201 with a link selection function, an input apparatus 210, and a display 220.

The input apparatus 210 has, for example, a touch panel, a mouse, or the like. The display 220 has, for example, a display of a personal computer, a smart phone, a tablet, or the like, and may be integrally with or separately from the input apparatus 210 or the motion picture reproducing apparatus 201 with the link selection function.

The motion picture reproducing apparatus 201 is provided with a communication unit 202, a content obtaining unit 203, a storage apparatus 204 configured to store therein video data and video correspondence information 205 (including the link area information 1, 2, 3 and so on), an area information analysis unit 207, a transition information obtaining unit 208, a transition information specification unit 211 including a transition information extraction unit 211a and an area specification unit 211b, a video reproduction unit 212, an input gesture determination unit 213, a display control unit 216 including a video display unit 216a and configured to control the display of the display 220, and a position input unit 218.

In the example, one example of the "position selecting device" according to embodiments or the present invention is constructed to include the input apparatus 210 and the position input unit 218. One example of the "determining device" according to embodiments or the present invention is constructed to include the area information analysis unit 207, the transition information specification unit 211, and the input gesture determination unit 213. One example of the "link destination controlling device" according to embodiments or the present invention is constructed to include the display control unit 216.

Next, with reference to a conceptual diagram in FIG. 3, an explanation will be given to a specific configuration of data for designating the link destination, generated by the interface apparatus 100 (refer to FIG. 1) and used on the interface apparatus 200 (refer to FIG. 2) according to the example.

In FIG. 3, the link area information, which is one example of the "data for link designation" according to the example, is constructed to include time information, time point information, coordinate information, gesture information, and transition information. Among them, the "coordinate information" is one example of the "position information" according to embodiments or the present invention, and the "transition information" is one example of the "link destination identification information" according to embodiments or the present invention. Moreover, in the example, the "range mark" according to embodiments or the present invention is a rectangular (oblong) frame mark.

The "link area information" is information generated according to generation/movement of the rectangular frame mark, which is set and moved by the interface apparatus for designation the link destination (refer to FIG. 1) as detailed later. The link area information is stored in the storage apparatus 106, is then transmitted to the interface apparatus for the viewer (refer to FIG. 2) via the Internet or the like, as detailed later, is stored in the storage apparatus 204, and is then used for subsequent link destination selection.

The "time information" is information indicating an elapsed time from setting of the frame mark corresponding to the link area information (in other words, a time duration on a reproduction time axis of motion picture content that is a target when the frame mark is set and moved), in units of seconds. The time information is set to indicate a variable length of time according to whether or not the frame mark is moved. For example, in a time zone in which the frame mark is not moved or is moved a little, the time information is set to have a value of 10 second time information ("50 S-60 S" on the lowest row in FIG. 3). On the other hand, in a time zone in which the frame mark is moved or is moved a lot, the time information is set to have a value of 2 second time information ("30 S-32 S" on the fourth row from the top in FIG. 3).

The "time point information" is information indicating timing at which the coordinate information is generated, i.e. a generation time point of the coordinate information on the reproduction time axis of the motion picture content, in a format in which frequency changes with respect to each time information (in other words, according to the frequency of the movement operations applied to the frame mark), in units of seconds.

The "coordinate information" is information indicating a relative position of the frame mark in an entire image area of the motion picture content. Moreover, in this example, since the frame mark is rectangular or oblong, an outer shape including a position and a size of the frame mark is determined, relatively uniquely, with respect to the whole image area of the motion picture content, only by the coordinates of an upper left corner and the coordinates of a lower right corner of a rectangular frame mark.

More specifically, it is assumed that XY coordinates of an upper left corner of the whole image area of the motion picture content is (0.0, 0.0), XY coordinates of a lower right corner thereof is (1.0, 1.0), XY coordinates of a lower left corner thereof is (0.0, 1.0), and XY coordinates of an upper right corner thereof is (1.0, 0.0).

For example, if the frame mark is set to the entire image area, the coordinate information may be set to be two coordinate information, which is the upper left coordinates (0.0, 0.0) and the lower right coordinates (1.0, 1.0). The use of such coordinate information allows the interface apparatus for the viewer (refer to FIG. 2) to perform control in such a manner that the link destination is selected when any display position or area of the motion picture content is selected.

For example, if the frame mark is set to a lower right quarter of the entire image area, the coordinate information may be set to upper left coordinates (0.5, 0.5) and lower right coordinates (1.0, 1.0). The use of such coordinate information allows the interface apparatus for the viewer (refer to FIG. 2) to perform control in such a manner that that the link destination is selected when a display position or an area in the lower right quarter of the motion picture content is selected (or that the link destination is not selected even if a display position or an area in the other three quarters is selected).

For example, if the frame mark is set to a right half of the entire image area, the coordinate information may be set to upper left coordinates (0.5, 0.0) and lower right coordinates (1.0, 1.0). The use of such coordinate information allows the interface apparatus for the viewer (refer to FIG. 2) to perform control in such a manner that that the link destination is selected when a display position or an area in the right half of the motion picture content is selected (or that the link destination is not selected even if a display position or an area in the other left half is selected).

The "gesture" is information generated and held depending on distinction between a plurality of types of input operations, such as tap, swipe, and drag, when the frame mark is set and moved.

For example, if the gesture here is the "tap", the interface apparatus 200 (refer to FIG. 2) can perform control in such a manner that motion picture content that is being reproduced is transited to another video, when the "tap" is performed at the display position or in the display area (i.e. in the area corresponding to the frame mark) indicated by the corresponding coordinate information, in accordance with a predetermined rule.

For example, if the gesture here is the "swipe", the interface apparatus 200 (refer to FIG. 2) can perform control in such a manner that another image (a still image or a motion picture) is displayed in a manner of window display or the like, with respect to the motion picture content that is being reproduced, when the "swipe" is performed at the display position or in the display area (i.e. in the area corresponding to the frame mark) indicated by the corresponding coordinate information, in accordance with a predetermined rule.

For example, if the gesture here is the "drag", the interface apparatus 200 (refer to FIG. 2) can perform control in such a manner that the transition to a Web page is done, in a manner of window display or the like, or by changing an entire image, with respect to the motion picture content that is being reproduced, when the "drag" is performed at the display position or in the display area (i.e. in the area corresponding to the frame mark) indicated by the corresponding coordinate information, in accordance with a predetermined rule.

By virtue of the above configuration, the interface apparatus 200 (refer to FIG. 2) can perform a process of transiting to another video if the tap operation is performed in some part of the motion picture content, for example, between 10 to 15 seconds of the motion picture content, by using the link area information. For example, between 15 to 20 seconds of the motion picture content, if the swipe operation is performed in the lower right quarter of the motion picture content, a process of displaying a particular image prepared in advance can be performed. For example, between 20 to 25 seconds of the motion picture content, if the drag operation is performed in the right half of the motion picture content, a process of displaying a Web page set in advance can be performed. For example, between 30 to 32 seconds of the motion picture content, if the tap operation is performed in an area that moves from the upper left to the lower right without changing its size and in which a selecting operation can be performed correspondingly to the frame mark, the process of transiting to another video can be performed. For example, between 40 to 42.5 seconds of the motion picture content, if the swipe operation is performed in an area in which the selecting operation can be performed correspondingly to the frame mark and which expands from the upper left quarter to the entire image, the process of displaying the particular image prepared in advance can be performed. For example, between 50 to 60 seconds of the motion picture content, if the drag operation is performed in an area that is changed from the upper left to the lower right immediately at a time point 55 seconds and in which the selecting operation can be performed correspondingly to the frame mark, the process of displaying the Web page set in advance can be performed.

As described above, the "link area information" is linked to the coordinate information corresponding to the transition information and the time point information, and is not linked at all on a system to an object that can exist in the motion picture content (particularly, its display position and area). By virtue of a series of operations by the user of the interface apparatus 100 (refer to FIG. 1) who performs a link destination designating operation while appropriately recognizing the presence of the object in the motion picture content, the "link area information" is consequently associated with the object (particularly its display position and area).

In any case, since the link area information includes no information that indicates the presence or absence and position of the object, the link area information (particularly, its data generating operation, data amount, data structure, etc.) can be generally simple, as illustrated in FIG. 3, regardless of the type of the object, the speed or complicacy in the movement of the object, the troublesomeness or unclearness of the object, or the like. This is extremely useful in practice.

Moreover, in the example illustrated in FIG. 3, the coordinate information is held or generated-and-held only if the coordinate information is changed (i.e. only if the movement operation is performed with respect to the frame mark). In other words, due to the fact that the link area information has not only the time point information but also the time (i.e. time-duration) information, it is not necessary to have the time point information, the coordinate information, or the like, in a time zone in which there is no time information. Thus, it is not necessary to redundantly hold or generate-and-hold the coordinate information having the same value or the like. It is therefore possible to prevent a data amount from being enlarged, thereby reducing a load in each process.

Next, with reference to a block diagram in FIG. 4, an explanation will be given to an entire structure of a system including: a server apparatus including the interface apparatus for designating the link destination illustrated in FIG. 1; and a client apparatus including the interface apparatus for the viewer illustrated in FIG. 2.

Figure 4:
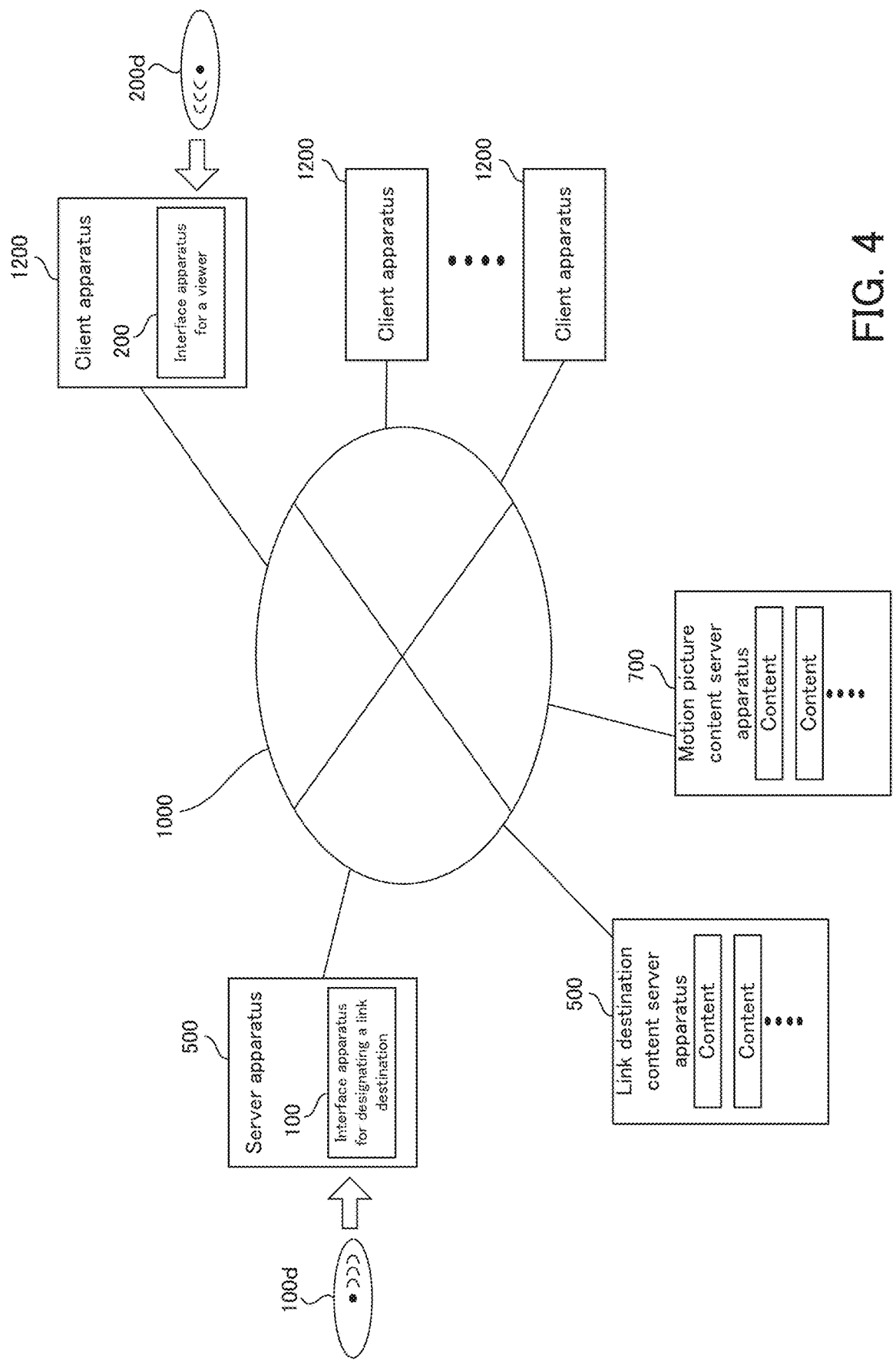
FIG. 4 is a conceptual block diagram illustrating that a server apparatus including the interface apparatus for designating the link destination, a client apparatus including the interface apparatus for the viewer and so forth are accommodated in a communication network, according to the example.

In FIG. 4, an Internet 1000 accommodates a server apparatus 500 including the interface apparatus 100 (refer to FIG. 1), a link destination content server apparatus 600 configured to provide the content of a link destination to the server apparatus 500, a motion picture content server apparatus 700 configured to provide the motion picture content to the server apparatus 500, and a plurality of client apparatuses 1200 each of which includes the interface apparatus 200.

The server apparatus 500 includes, for example, a personal computer, a workstation, a mobile device, and the like, and an optical disc 100*d* can be mounted thereto. The interface apparatus 100 (refer to FIG. 1) can be relatively easily realized in the server apparatus 500 by reading and executing a computer program, which is stored in the optical disc 100*d* and which is to make a computer perform each process associated with the link destination designation on the content provider side as detailed later (refer to FIG. 5 to FIG. 8). Alternatively, such a computer program may be downloaded to the server apparatus 500 through the Internet 1000.

The client apparatus 1200 includes, for example, a personal computer, a high-performance television, a mobile device, a smart phone, and the like, and an optical disc 200*d* can be mounted thereto. The interface apparatus 200 (refer to FIG. 2) can be relatively easily realized in the client apparatus 1200 by reading and executing a computer program, which is stored in the optical disc 200*d* and which is to make a computer perform each process associated with the link destination selection on a viewer side as detailed later (refer to FIG. 9). Alternatively, such a computer program may be downloaded to the client apparatus 1200 through the Internet 1000.

Next, with reference to flowcharts in FIG. 5 and FIG. 6 together with FIG. 1 to FIG. 4, an explanation will be given to an operation of the interface apparatus 100 having the basic configuration as illustrated in FIG. 1, and its detailed configuration. At this time, from among conceptual diagrams regarding the operation of the interface apparatus 100 illustrated in FIG. 10 to FIG. 18, a drawing(s) related to each operation or each step explained below will be referred to, as occasion demands.

Figure 5:
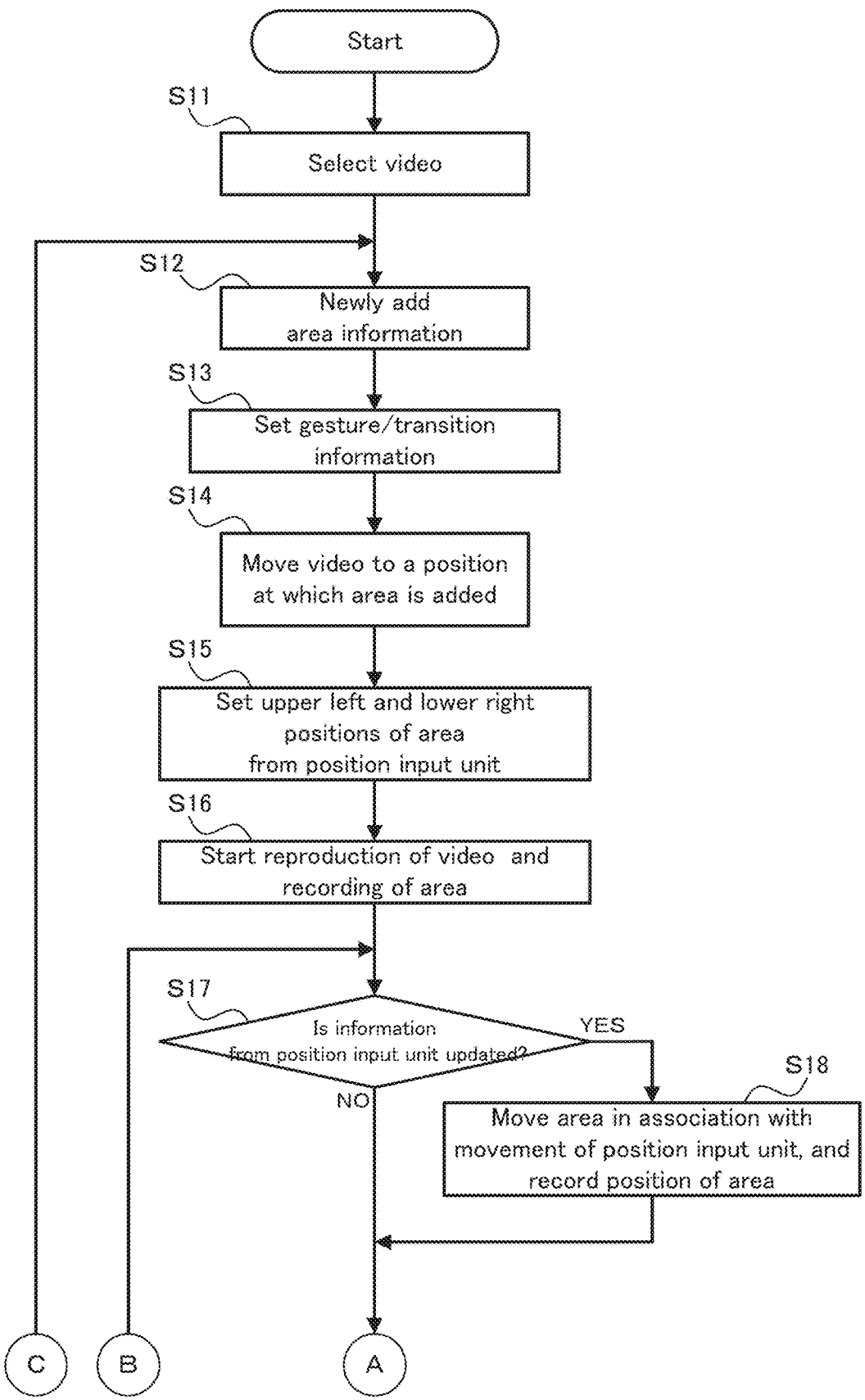
FIG. 5 is a flowchart (1st part) illustrating a flow of one example of an operation of the interface apparatus for designating the link destination, according to the example.

In FIG. 5, firstly, the motion picture content to which the link destination designation is to be performed is selected; namely, the video data stored in the storage apparatus 102 is selected, via the input apparatus 110 (step S11).

Then, initial setting of the link area information (refer to FIG. 3) required at each setting of the frame mark, i.e. an operation associated with new addition of area information, is performed via the input apparatus 110 (step S12). In other words, the link area information, which is initially in an empty state, is newly generated, and is stored in the storage apparatus 106.

Then, the gesture and the transition information (refer to FIG. 3) are set for the newly added link area information via the input apparatus 110 (step S13). In other words, on the storage apparatus 106, respective columns of the gesture and the transition information in the newly stored link area information in the empty state are filled, with respect to the frame mark to be set next.

Then, on the video reproduction unit 103, the selected video data is moved by fast-forwarding, forwarding with time point designation, or the like, to a video time point at which the link area information is to be generated (step S14).

Then, the video forwarded in this manner is displayed on the display 120, preferably by still image reproduction, by the video reproduction unit 103 and the video display unit 107*a*. In this state, the upper left coordinates and the lower right coordinates associated with the frame mark are set by the input apparatus 110 and the position input unit 105. At this time, the frame mark during the setting and at the completion of the setting is displayed by the area information display unit 107*b* in a screen of the display 120 in a manner of being superimposed on the video. Eventually, the frame mark having the size and the position in which the setting is completed, at a video time point of the video displayed at this time point, is displayed in the screen of the display 120 in the manner of being superimposed on the video (step S15).

Figure 10:
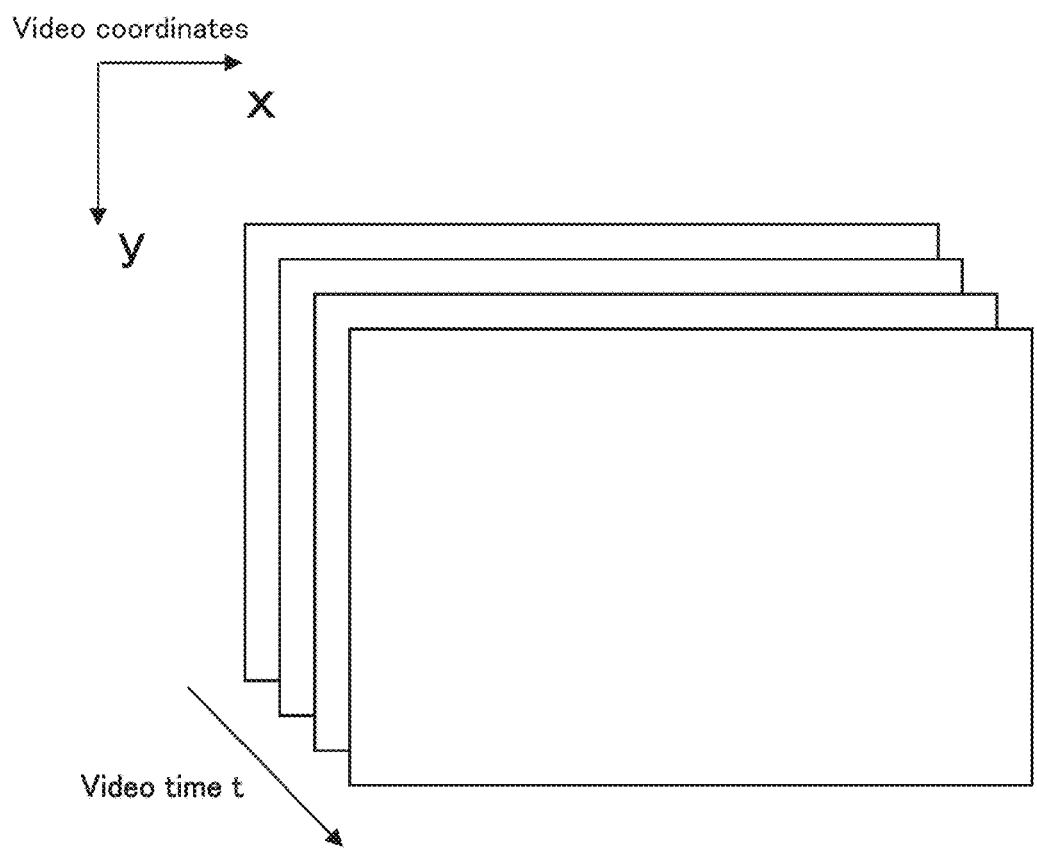
FIG. 10 is a conceptual diagram illustrating a relation among motion picture content, the data for designating the link destination, and a reproduction time, according to the example.

Here, as illustrated in FIG. 10, for example, a video, which is one example of the "motion picture content" according to embodiments or the present invention, comprises a plurality of frame videos, with respect to a video time t (i.e. a video time point t on a video time axis), which is one example of the "reproduction time" according to embodiments or the present invention. X coordinates and y coordinates are defined commonly for all the frame videos. In general, depending on the specifications, standards, or the like of the display 120, an edge part of each frame video is not displayed in a manner of protrusion, or only a part of the frame video is actively segmented (or cut out) and displayed, or the frame video is displayed with a changed aspect ratio or with changed longitudinal and lateral magnification, in the screen of the display 120. Particularly in the example, however, the x coordinates and the y coordinates are defined as relative positions of the frame video to an entire video area (i.e. an entire image area).

Figure 11:
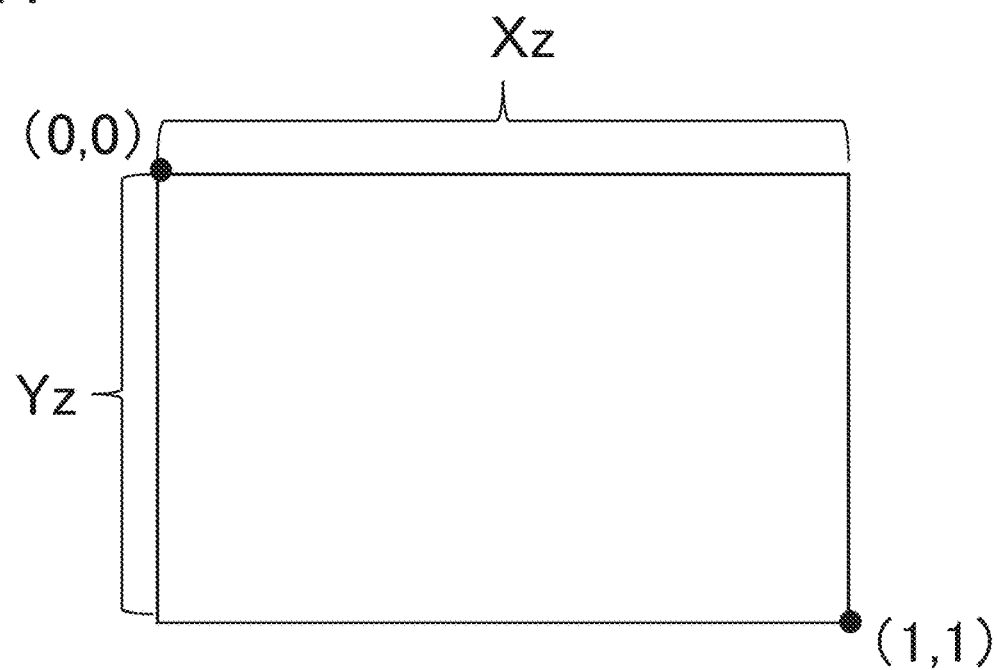
FIG. 11 is a conceptual diagram illustrating one image for explaining the operation of the interface apparatus for designating the link destination, according to the example.

More specifically, as illustrated in FIG. 11, for example, the upper left corner of the entire video area of the frame video is set to coordinates (0, 0), and the lower right corner of the entire video area of the frame video is set to coordinates (1,1). The coordinates therefore do not depend on the number of longitudinal and lateral pixels or a longitudinal and lateral scale ratio of the screen of the display 120. Moreover, regarding a relation with the display 220 (refer to FIG. 2) on the viewer side described later, the coordinates do not depend on the number of longitudinal and lateral pixels or a longitudinal and lateral scale ratio of the screen of the display 220.

Figure 12:
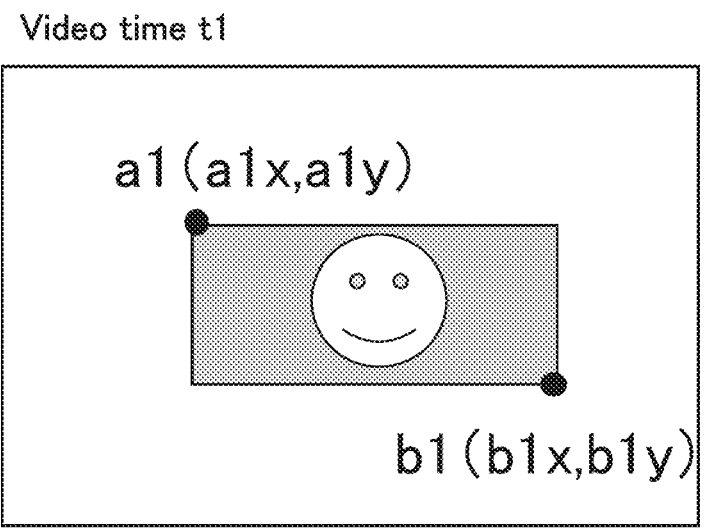
FIG. 12 is a conceptual diagram illustrating another image for explaining the operation of the interface apparatus for designating the link destination, according to the example.

As illustrated in FIG. 12, for example, in the step S15, firstly at a video time t1, a video including a "face" is displayed by still image reproduction in the screen of the display 120. At this time point, the "face" displayed in the screen is considered to be one "object" that is a target to set up a link, by the user who operates the input apparatus 110 while looking at the screen of the display 120.

As a result, the rectangular frame mark that surrounds a link area illustrated in gray is set to surround the "face" by the input operation of the input apparatus 110 by the user looking at the display 120.

At this time, the frame mark is represented by relative coordinates of the video to the entire image area, and is uniquely set with respect to the video time t1 by using upper left coordinates a1 (a1x, a1y) and lower right coordinates b1 (b1x, b1y).

The "link area" according to the example is a partial area in the video in which the transition is performed when an action, such as tap, swipe, and drag, is performed later on the interface apparatus for the viewer. The link area is not necessarily displayed in a visible manner later on the interface apparatus for the viewer, and is not displayed in the example. The "frame mark" according to the example is a frame mark that illustrates, on the display 120 on the interface apparatus for designating the link destination, an area in which the transition is performed later when an action such as tap, swipe, and drag is performed. Simply, as illustrated in FIG. 12, the frame mark may be a rectangular frame-shaped mark that surrounds an entire area of the rectangular link area. Such a frame mark comprises, for example, a narrow red line or a narrow fluorescent line so that it can be viewed regardless of video content, and is displayed in the screen of the display 120 as a frame that is superimposed and displayed on the video.

For example, particularly in the example, the frame mark can be set freely extendable in the screen by using a zoom operation on a touch panel, and can be moved longitudinally and laterally in the screen, for example, via the input apparatus 110.

By virtue of such a configuration, the user can simply designate the frame mark with an appropriate size, while visually confirming the video and the freely extendable frame mark that is superimposed on the video in the screen. Then, the frame mark indicating a range with the appropriate size may be moved via the input apparatus 110, which is useful.

Figure 13:
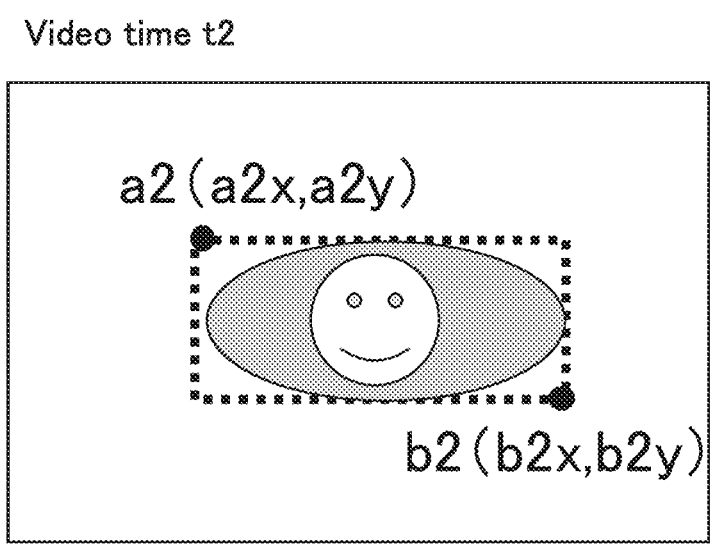
FIG. 13 is a conceptual diagram illustrating another image for explaining the operation of the interface apparatus for designating the link destination, according to the example.

On the other hand, as illustrated in FIG. 13, for example, the frame mark may be a frame-shaped mark that surrounds an oval (i.e. an area in gray in the drawing) and the link area may be the oval (i.e. the area in gray in the drawing). Even in this case, if there is provided such a rule in advance that the frame mark and the link area are respectively an oval inscribed in the rectangle, then, the frame mark or the link area can be uniquely set with respect to the video time t1 by using the upper left coordinates and the lower right coordinates of the rectangle illustrated in a dashed line in the drawing.

In FIG. 13, while the frame mark may be set as the rectangular mark illustrated in the dashed line in the drawing (i.e. while the rectangular frame mark is displayed on the display 120), the link area in a different shape that has a predetermined relation with the frame mark, i.e. the oval link area, may be set. As long as the rule is provided in advance in this manner and the rule is known to the user of the interface apparatus for designating the link destination, the shapes of the frame mark and the link area may be the same as or different from each other, and the shapes are arbitrary. The shapes may be not only rectangular or circular, but also polygonal or the like.

As described above, with respect to the coordinates indicating the frame mark or the link area (the areas in gray in FIG. 12 and FIG. 13), the gesture and the transition information set in the step S13 are defined. In other words, a part of the link area information (refer to FIG. 3) with respect to the video time t1 is generated and filled.

Back in FIG. 5, the reproduction of the video is started, and the frame mark is moved via the input apparatus 110 on which a manual operation is performed by the user who watches the video on the display 120. With the start of the reproduction of the video, the moving operation of the frame mark is started, and recording of the coordinate information, the time information, and the time point information, which constitute the link area information in correspondence with the moving operation is started (step S16).

For example, if the input apparatus 110 is a mouse, such motion picture reproduction and information recording may be started according to an operation of pressing a left button of the mouse. Alternatively, if the input apparatus 110 is a touch panel, such motion picture reproduction and information recording may be started according to an operation of touching the screen of the display 120.

Moreover, it is determined whether or not the coordinate information from the position input unit 105 or its original position signal is updated according to the implementation of the moving operation of the frame mark on the display 120 by the user (step S17). For example, if the input apparatus 110 is a mouse or a touch panel, it is monitored whether or not the drag is performed.

If it is determined that it is updated (the step S17: YES), the frame mark is moved on the display 120 under the display control by the area information display unit 107a according to a change in the coordinate information inputted from the position input unit 105 or its original position signal. Typically, the frame mark is moved to follow the movement of the object by the manual operation for the input apparatus 110 by the user who watches the object (e.g. the face illustrated in FIG. 12) that moves in the video that is being reproduced.

In parallel with this, the coordinate information indicating a display area of the frame mark is generated from movement information from the position input unit 105, and is stored into the storage apparatus 106 in association with the time information and the time point information at each video time t (step S18).

As described above, in the example, the information recording is performed only if the moving operation of the frame mark is performed via the input apparatus 110 (e.g. only if the drag is performed by a mouse or a touch panel), which prevents a data amount from being enlarged.

After the coordinate information is stored in the step S18, or if it is determined that the coordinate information from the position input unit 105 is not updated (the step S17: NO), the flow moves to processes in FIG. 6.

Now, out of the processes in the step S17 and the step S18, an explanation will be given to a case where the link area is not moved, with reference to FIG. 14 and FIG. 15.

Figure 14:
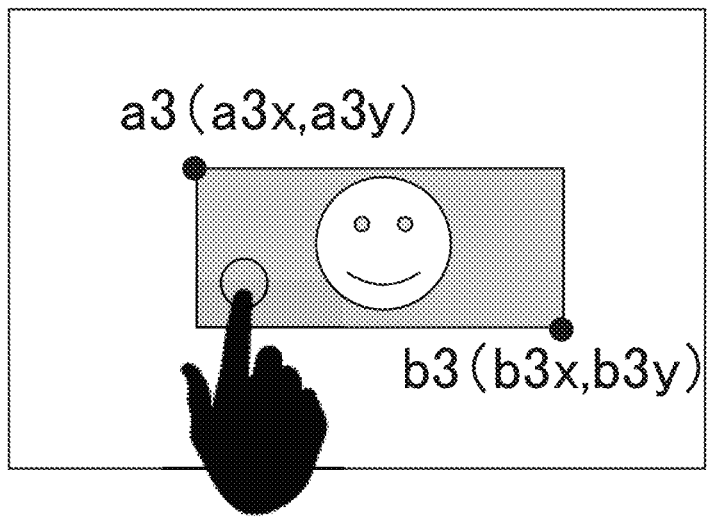
FIG. 14 is a conceptual diagram illustrating another image for explaining the operation of the interface apparatus for designating the link destination, according to the example.

As illustrated in FIG. 14, if the link area is not moved (i.e. in the case of the step S17: NO), a video time t3 at which it is desired to start the setting of the link area in the video is designated via the input apparatus 110. The designation is performed, for example, by using a standard interface (IF) of a smart phone device, which is one example of the input apparatus 110, for designating time. For example, it is assumed that the video is temporarily stopped when the video time t3 is designated. In that state, an upper left position a3 and a lower right position b3 of the frame mark are designated on the screen of the display 120 via the input apparatus 110 such as a touch panel and a mouse. This operation is performed as a link area designation mode. If the upper left position a3 is designated, (a3x, a3y) is generated as coordinates indicating the upper left position a3. If the lower right position b3 is designated, (b3x, b3y) is generated as coordinates indicating the lower right position b3. They are stored into the storage apparatus 106 as the coordinate information, which constitutes a part of the link area information.

Then, the mode is changed to a link area recording mode. For example, the video reproduction is continued while a touch panel that constitutes the input apparatus 110 is tapped and the touch or contact is maintained after the tapping, or while a mouse that constitutes the input apparatus 110 is being clicked. In parallel with this, the link area information (i.e. the coordinate information, the time information, the time point information, etc.) is successively generated.

Figure 15:
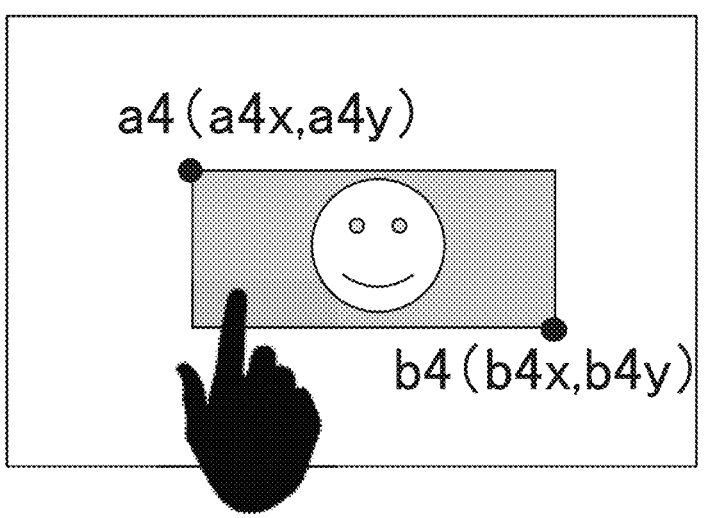
FIG. 15 is a conceptual diagram illustrating another image for explaining the operation of the interface apparatus for designating the link destination, according to the example.

As illustrated in FIG. 15, for example, a finger is detached from the touch panel that constitutes the input apparatus 110 (i.e. the touch is released) or the click of the mouse is released, at a video time t4, which is after the video time t3 illustrated in FIG. 14. Then, the video is stopped under the control by the display control unit 107. By the time, the frame mark has been moved to a position with an upper left position a4 and a lower right position b4. By these operations, the link area between the video times t3 and t4 in which it is desired to set the link area can be designated, very effectively and practically.

While the video is reproduced after changing the original video speed (e.g. fast-forwarding reproduction or slow reproduction is performed), an operation associated with the start, continuation and end of such video reproduction can be performed in the same manner. By this, the link area can be more easily designated between the video times t3 and t4.

Now, out of the processes in the step S17 and the step S18, a case where the link area is moved will be explained with reference to FIG. 16 to FIG. 18.

Figure 16:
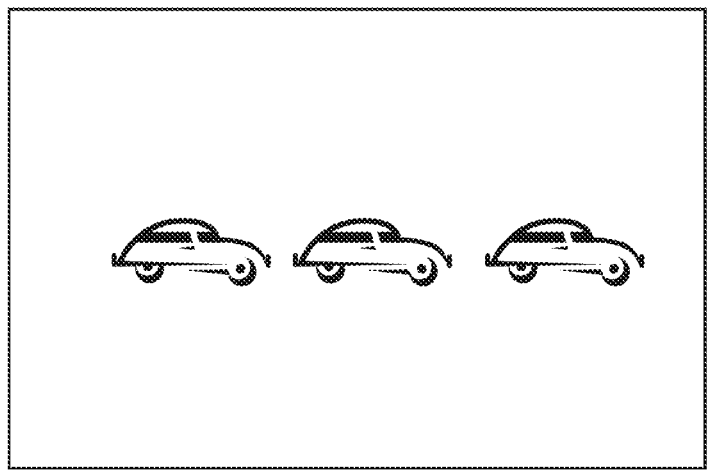
FIG. 16 is a conceptual diagram illustrating another image for explaining the operation of the interface apparatus for designating the link destination, according to the example.

As illustrated in FIG. 16, for example, in a case where the link area is moved, there is considered an example in which an automobile runs through from the left to the right in the screen, as the video. In this case, the position of the automobile is a position C5 at a video time t5, a position C6 at a video time t6, and a position C7 at a video time t7. The video exists as the frame videos in many time series, continuously, between the video times t5 and t8. In the example, however, for convenience of explanation, video content that exists only at three time points (i.e. three frames) will be exemplified, and the case where the link area is moved will be explained.

Figure 17:
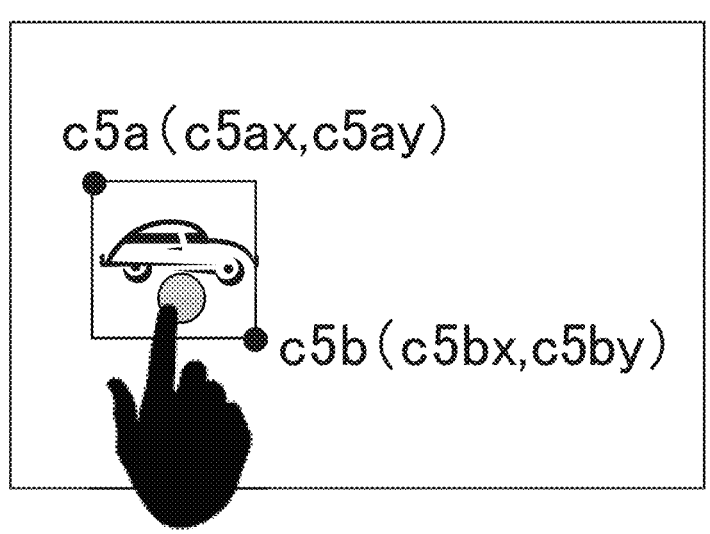
FIG. 17 is a conceptual diagram illustrating another image for explaining the operation of the interface apparatus for designating the link destination, according to the example.

As illustrated in FIG. 17, for example, as in the case of FIG. 14, a video time at which it is desired to set the link area in the video is designated via the input apparatus 110. For example, when the video time t5 is designated, the video is temporarily stopped, and an upper left position c5a and a lower right position c5b of the frame mark are designated on the screen of the display 120 via the input apparatus 110. This operation is performed as the link area designation mode.

Then, the mode is changed to the link area recording mode, and for example, the touch panel or the mouse that constitutes the input apparatus 110 is tapped or clicked, by which the recording of the link area information is started at the video time t5. Moreover, for example, the touch panel or the mouse that constitutes the input apparatus 110 keeps being tapped or clicked, by which the link area information (i.e. the coordinate information, the time information, the time point information, etc.) is successively generated between the video times t5 and t6.

Figure 18:
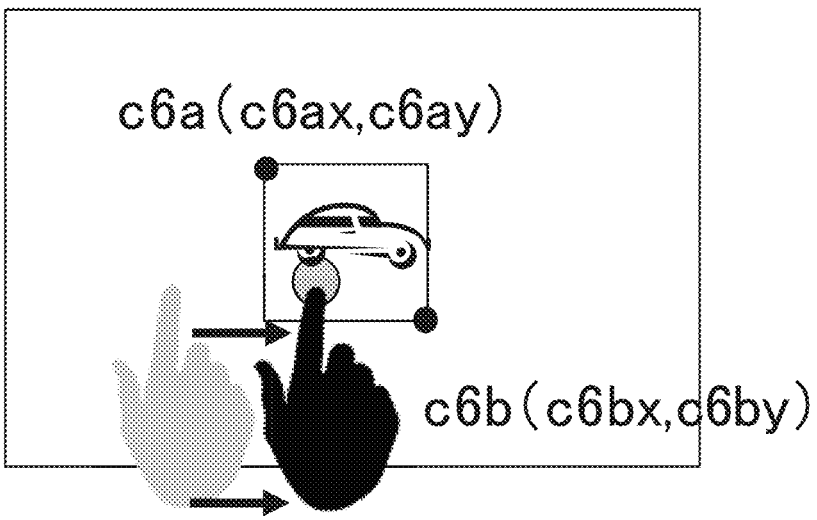
FIG. 18 is a conceptual diagram illustrating another image for explaining the operation of the interface apparatus for designating the link destination, according to the example.

As illustrated in FIG. 18, for example, the position of the automobile in the video in the screen of the display 120 is moved from the position c5 to the position c6 in correspondence with to the video time t5 changing to the video time t6. Between the video times t5 and t6, the frame mark is forced to follow the movement of the automobile in the screen of the display 120 by the manual operation by the user of the input apparatus 110, for example, by the manual operation using the user's vision, such as sliding the touch panel while the touch panel keeps being tapped, or moving the mouse while the mouse keeps being clicked. In accordance with the movement of the frame mark, the coordinate information determined from the frame mark at each reproduction time is successively generated as a part of the link area information (refer to FIG. 3), together with the time information and the time point information.

As described above, according to the example, the link area can be continuously specified, simply and practically, by the operation using a human's vision, which is the user's vision, without any need to analyze the object in the video.

Figure 6:
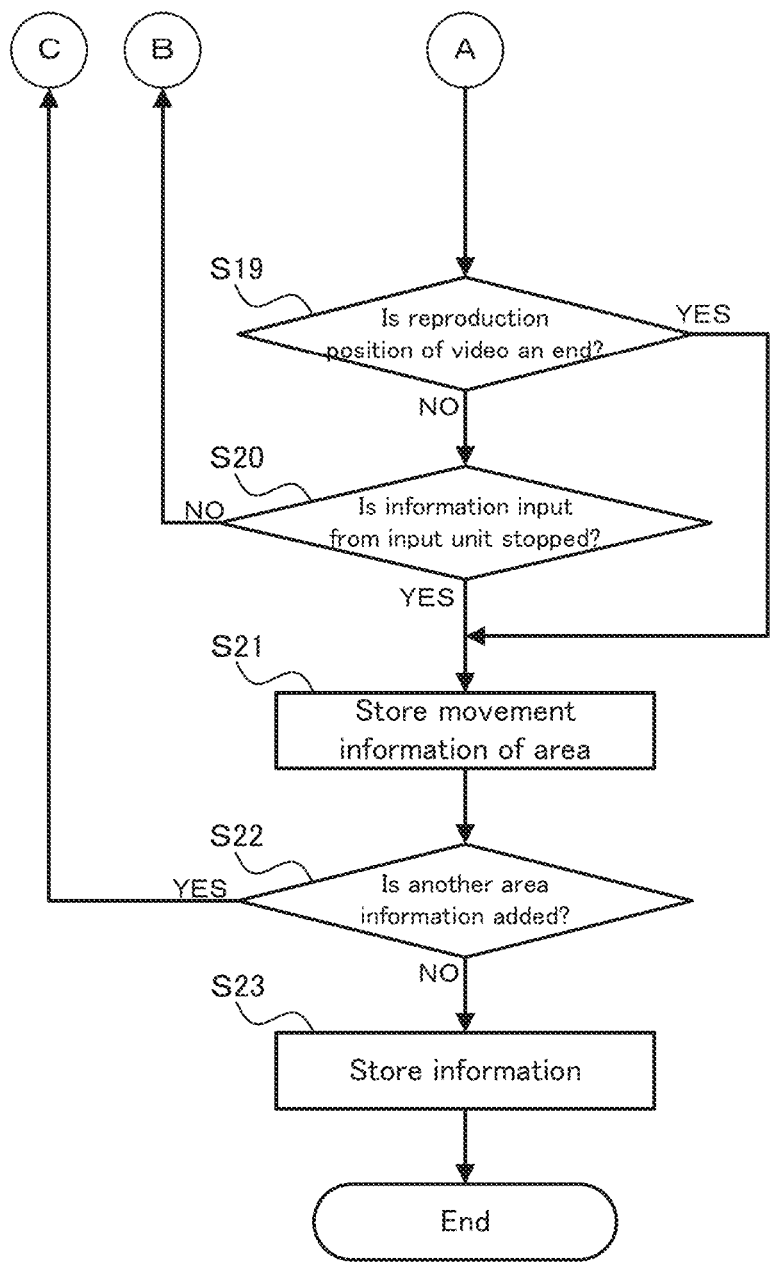
FIG. 6 is a flowchart (2nd part) illustrating the flow of one example of the operation of the interface apparatus for designating the link destination, according to the example.

Then, in FIG. 6, it is determined whether or not a reproduction position of the video that is being reproduced is an end by the video reproduction unit 103, after the step S17 or the step S18 in FIG. 5 (step S19). If it is determined that the reproduction position is not the end (the step S19: NO), it is further determined whether or not the input of the coordinate information from the position input unit 105 or its original position signal is stopped (step S20). In the determination here, for example, if the input apparatus 110 is a mouse, it may be monitored whether or not a left button of the mouse is released. If the input apparatus 110 is a touch panel, it may be monitored whether or not the user's hand is released from the touch panel.

If it is determined that the input is not stopped (the step S20: NO), the process returns to the step S17 already illustrated in FIG. 5, and the subsequent process is repeatedly performed.

On the other hand, if it is determined that the reproduction position of the video is the end in the step S19 (the step S19: YES), or if it is determined that the input is stopped in the step S20 (the step S20: YES), the coordinate information generated so far is stored into the storage apparatus 106 as the link area information (refer to FIG. 3), together with the time information and the time point information (step S21).

It is then determined whether or not further link area information is added to be generated and stored into the storage apparatus 106 (step S22), and if it is added (the step S22: YES), the process returns to the step S12 already illustrated in FIG. 5, and the subsequent process is repeatedly performed.

On the other hand, if the link area information is not added to be generated and stored (the step S22: NO), the link area information (refer to FIG. 3) with each item appropriately filled up is stored into the storage apparatus 106, so that a series of process operations associated with the link destination designation is completed.

In the above manner, the operation of generating and storing the link area information (refer to FIG. 3) is completed on the interface apparatus for designating the link destination (refer to FIG. 1).

As explained above, according to the interface apparatus 100 in the example, the frame mark is moved in a desired direction according to the user's manual operation, with a lapse of the video time, by the operation of the input apparatus 110 and the position input unit 105, or the like. Before or after, or in parallel with this, the link area information including the coordinate information, the time point information, and the like is stored into the storage apparatus 106. At this time, the transition information, which constitutes one example of the "link destination (link destination identification information)" according to embodiments or the present invention, includes the frame mark or its coordinate position and is associated with the link area information, without being associated with the corresponding object on the system. It is therefore unnecessary to perform image analysis such as object analysis, and advanced data processing such as image recognition.

As described above, according to the example, the user of the interface apparatus 100 (i.e. a person on the content provider side) can easily perform the operation of designating a desired link destination, on arbitrary video content.

Particularly in the example, the coordinate information, which constitutes the link area information, is coordinate information indicating a relative position of the frame mark or a relative position of the link area to the entire image area of the video content. Therefore, the link destination can be accurately or certainly designated on the user side of the interface apparatus 100, regardless of the specifications, standards, or the like of the display 120.

Particularly in the example, the frame mark is set to have a rectangle that can be changed at a desired position and in a desired size on the screen of the display 120 (refer to FIG. 12), which is extremely useful in practice.

Particularly in the example, as the relative position to the entire video area, the relative position of the frame mark is represented by the coordinates of the two corners (i.e. the upper left coordinates and the lower right coordinates) to the entire video area. This provides such a practical benefit that it is visually easy to understand and is easy to operate, from the viewpoint of the user who handles the input apparatus 110.

Particularly the example can be configured in such a manner that the coordinate information is recorded while the record mark is moved, and that the coordinate information with the same value is not repetitively recorded while the frame mark is not moved. It is thus possible to efficiently avoid the enlargement of handling data without deteriorating the original function.

Particularly in the example, a plurality of transition information associated with a plurality of link destinations can be inputted, depending on distinction between a plurality of types of input operations such as tap, swipe, and drag on the input apparatus 110. At the interface apparatus 200 later, it is thus possible to simply establish an environment in which content of different link destinations is displayed, by performing different types of input operations later regarding one object.

Figure 7:
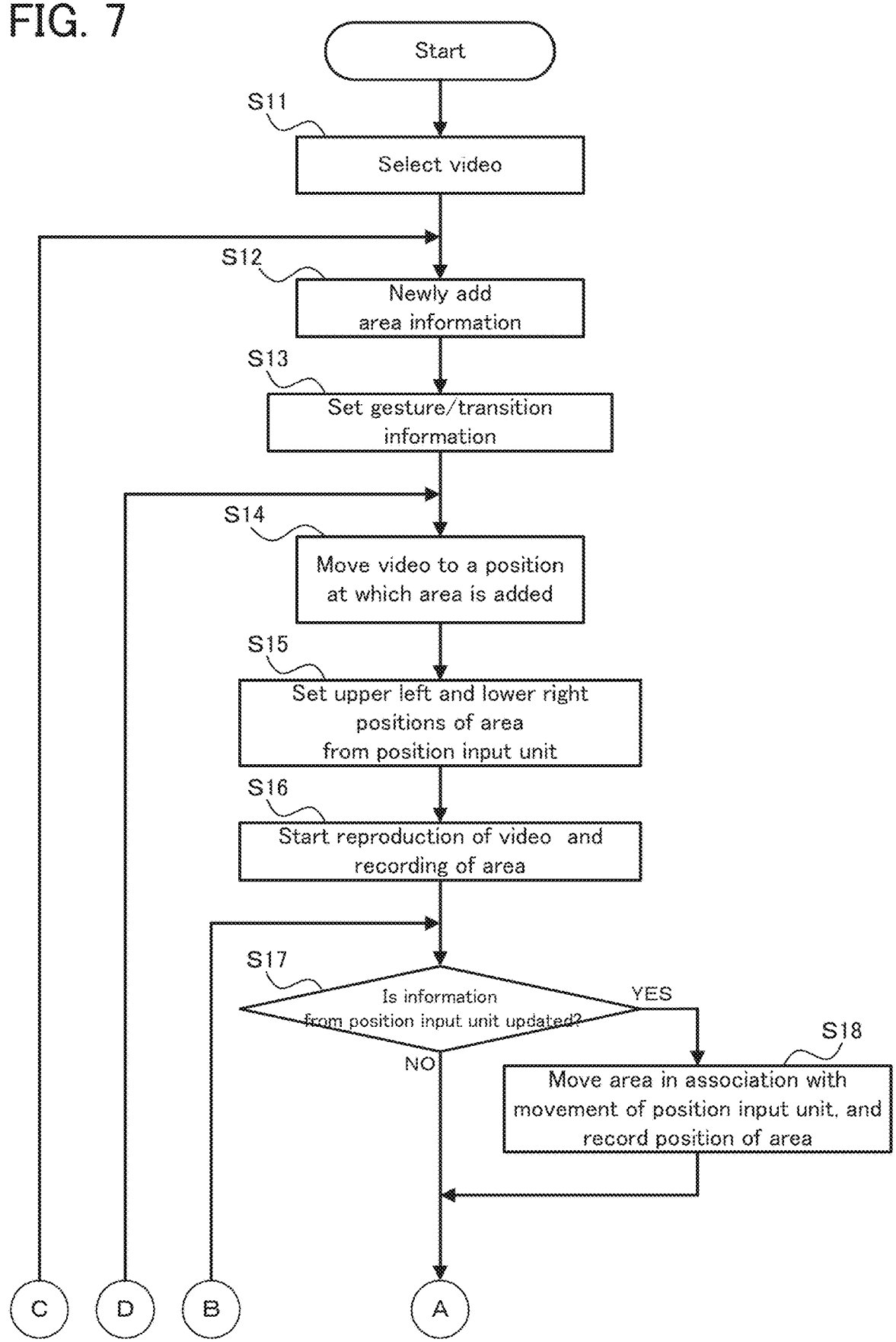
FIG. 7 is a flowchart (1st part) illustrating a flow of another example of the operation of the interface apparatus for designating the link destination, according to the example.
Figure 8:
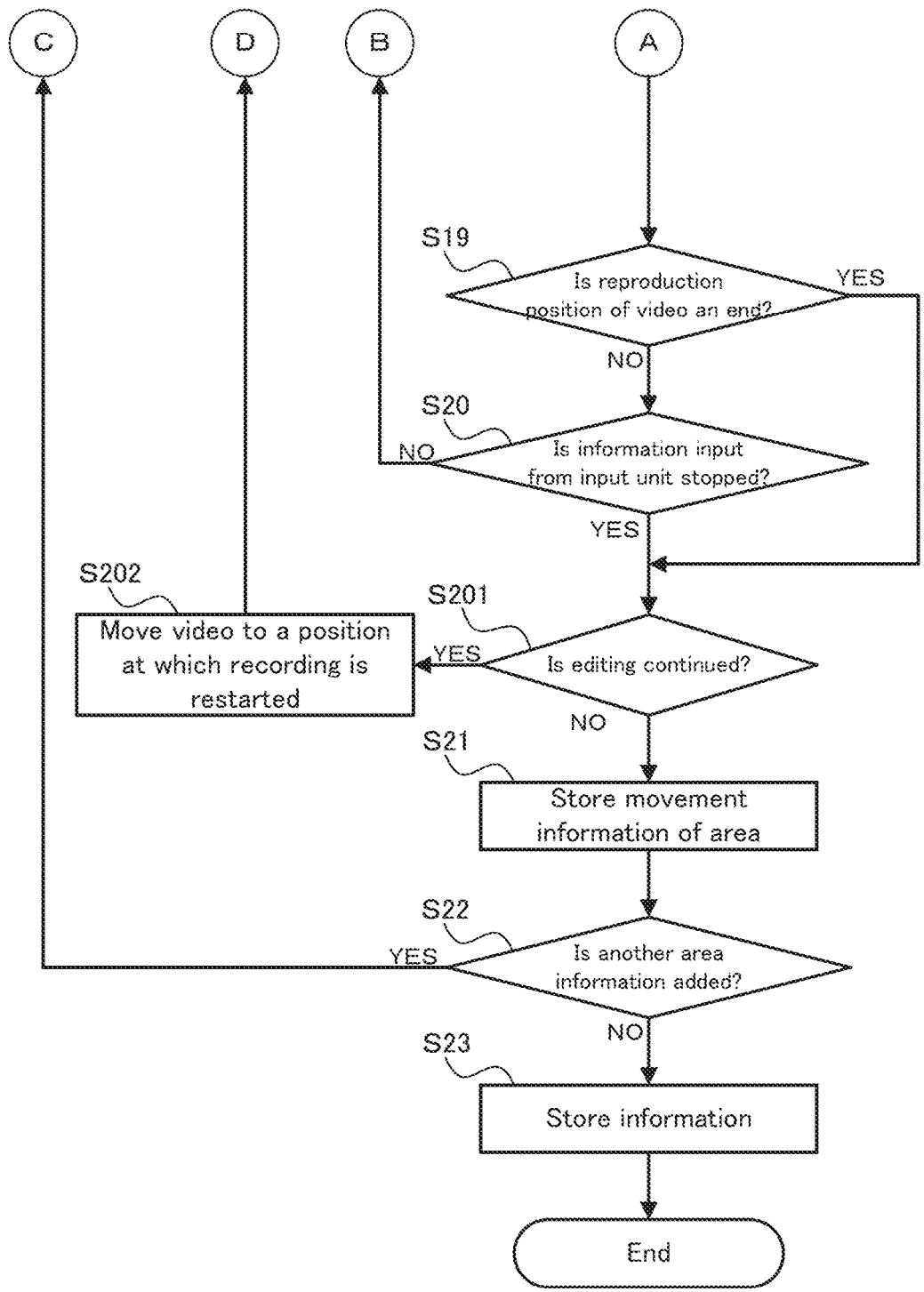
FIG. 8 is a flowchart (2nd part) illustrating the flow of another example of the operation of the interface apparatus for designating the link destination, according to the example.

Next, with reference to flowcharts in FIG. 7 and FIG. 8, an explanation will be given to another example of the operation of the interface apparatus 100 explained with reference to FIG. 4. In FIG. 7 and FIG. 8, the steps that are the same as those in FIG. 5 and FIG. 6 will carry the same step numbers, and their explanation will be omitted, as occasion demands. At this time, from among conceptual diagrams regarding the operation of the interface apparatus 100 illustrated in FIG. 19 to FIG. 23, a drawing(s) related to each operation or each step explained below will be referred to, as occasion demands.

In FIG. 7, the processes in the step S11 to the step S18 are performed, same as in FIG. 5. In FIG. 8, the processes in the step S19 to the step S20 are performed, same as in FIG. 6.

In FIG. 8, if the process in the step S20 is completed (the step S20: YES), it is determined whether or not editing is to be continued, i.e. whether or not further link area information is to be generated and stored for the video content that was a target to generate the link area information until now, on the basis of a command indicating that, wherein the command is inputted via the input apparatus 110 (step S201). For example, the editing here is to be continued if there are two or more discontinuous link areas on the video time axis for the same video content. Alternatively, the editing here is to be continued if there are a plurality of objects in the video content and a plurality of link destinations respectively corresponding to the objects are designated.

If it is determined that the editing here is to be continued (the step S201: YES), the video is moved to a position of restart of the video that is a target for further link destination designation (more specifically, the reproduction position is moved forward or backward on the video reproduction time axis). Then, the process returns to the step S15 in FIG. 7, and the subsequent process is repeatedly performed. In other words, as the continuation of the editing, the change of the transition destination and the gesture, the size change of the frame mark, the change of an initial position, and the like are performed by the user operating the input apparatus 110. As the moving operation of the frame mark after these changes is performed correspondingly to a new object, the editing is continued.

If it is determined that the editing here is not to be continued (the step S201: NO), the processes in the step S21 to the step S23 are performed, as in FIG. 6, and a series of process operations associated with the link destination designation is completed.

Now, out of the processes including the step S201 and the step S202, a case where the link area is designated at two discontinuous times will be explained with reference to FIG. 19 to FIG. 23.

Figure 19:
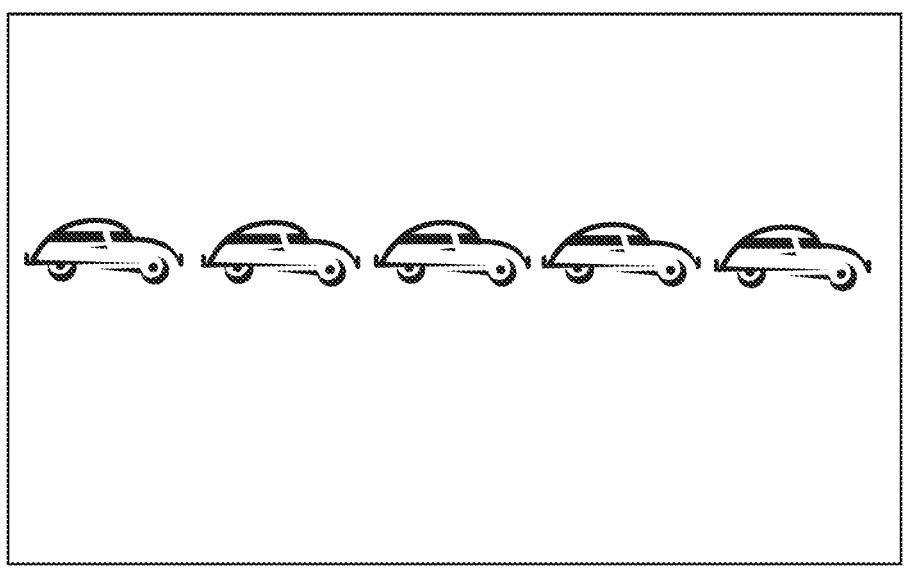
FIG. 19 is a conceptual diagram illustrating another image for explaining the operation of the interface apparatus for designating the link destination, according to the example.

As illustrated in FIG. 19, for example, there is considered an example in which an automobile runs through from the left to the right in the screen, as the video. At this time, the position of the automobile is a position C8 at a video time t8 (refer to FIG. 20), a position C9 at a video time t9 (refer to FIG. 21), a position C11 at a video time t11 (refer to FIG. 22), and a position C12 at a video time t12 (refer to FIG. 23). The video exists as the frame videos in many time series, continuously, between the video times t8 and t9, between the video times t9 and t10, between the video times t10 and t11, and between the video times t11 and t12. In the example, however, for convenience of explanation, video content that exists only at five time points (i.e. five frames) will be exemplified, and the case where the link area is moved will be explained.

Figure 20:
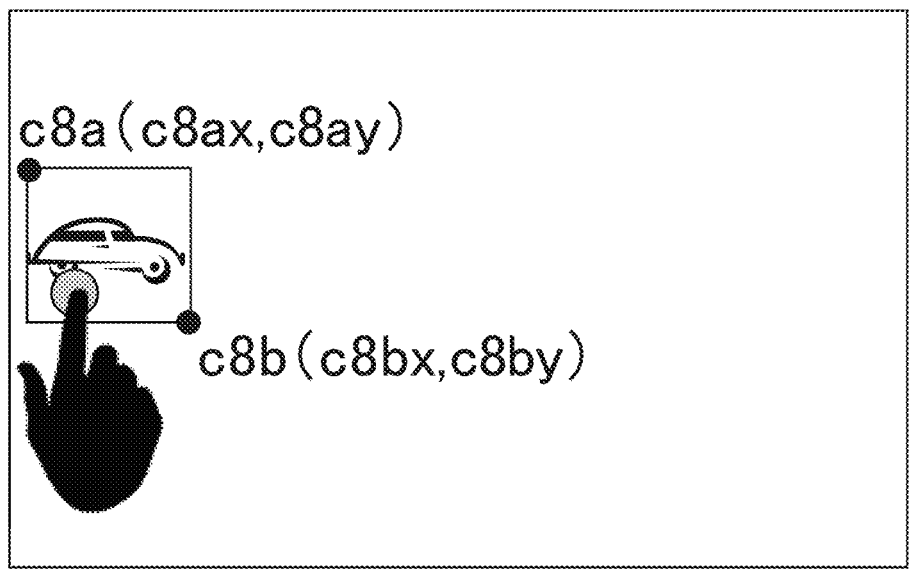
FIG. 20 is a conceptual diagram illustrating another image for explaining the operation of the interface apparatus for designating the link destination, according to the example.

As illustrated in FIG. 20, for example, as in the case in FIG. 14, a video time at which it is desired to start the setting of the link area in the video is designated via the input apparatus 110. For example, when the video time t8 is designated, the video is temporarily stopped, and an upper left position c8a and a lower right position c8b of the frame mark are designated on the screen of the display 120 via the input apparatus 110. This operation is performed as the link area designation mode.

Then, the mode is changed to the link area recording mode, and for example, the touch panel or the mouse that constitutes the input apparatus 110 is tapped or clicked, by which the recording of the link area information is started at the video time t8. Moreover, for example, the touch panel or the mouse that constitutes the input apparatus 110 keeps being tapped or clicked, by which the link area information (i.e. the coordinate information, the time information, the time point information, etc.) is generated between the video times t8 and t9.

Figure 21:
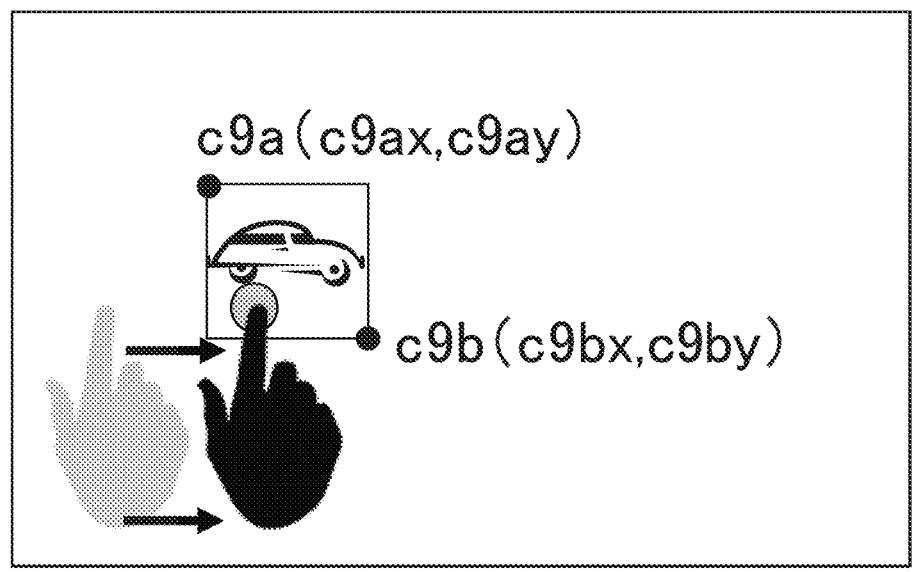
FIG. 21 is a conceptual diagram illustrating another image for explaining the operation of the interface apparatus for designating the link destination, according to the example.

As illustrated in FIG. 21, for example, the position of the automobile in the video in the screen of the display 120 is moved from the position c8 to the position c9 according to the video time t8 changing to the video time t9. Between the video times t8 and t9, the frame mark follows the movement of the automobile in the screen of the display 120 by the manual operation by the user of the input apparatus 110, for example, by the manual operation using the user's vision, such as (i) sliding the touch panel while the touch panel keeps being tapped, or (ii) moving the mouse while the mouse keeps being clicked. In accordance with the movement of the frame mark, the coordinate information determined from the frame mark at each reproduction time is generated as a part of the link area information (refer to FIG. 3), together with the time information and the time point information.

Moreover, the video displayed on the display 120 is temporarily stopped under the control of the display control unit 107 by the user's operation via the input apparatus 110 such as, for example, releasing the contact with the touch panel or releasing the click of the mouse. At this time, the frame mark may be displayed without change or may be once deleted. Alternatively, a display aspect or style of the frame mark may be changed.

Figure 22:
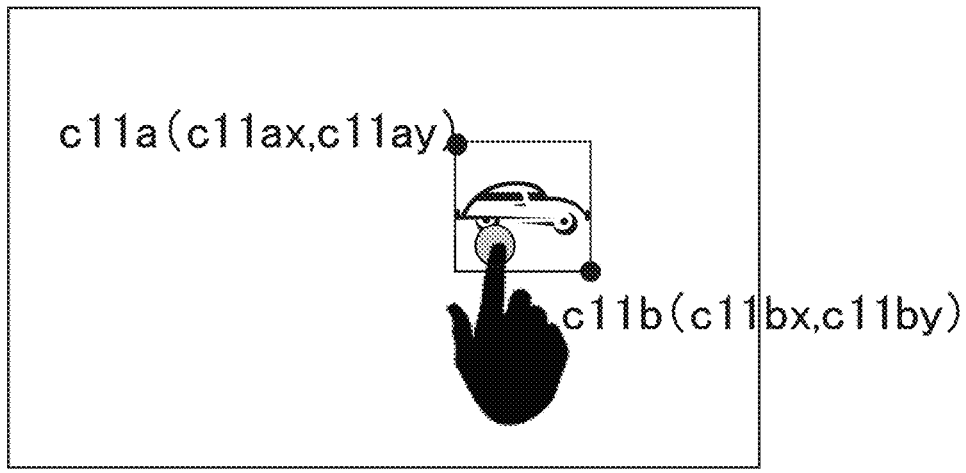
FIG. 22 is a conceptual diagram illustrating another image for explaining the operation of the interface apparatus for designating the link destination, according to the example.

Then, as illustrated in FIG. 22, for example, the video is temporarily stopped at the video time t9. From this state, if the video time t11 is designated as the video to be reproduced by the input apparatus 110, the video after the automobile is discontinuously or instantly moved to the position C11 is reproduced under control of the video reproduction unit 103. Then, again, the mode is changed to the link area recording mode. For example, the touch panel or the mouse that constitutes the input apparatus 110 is tapped or clicked in the link area recording mode, by which the recording of the link area information is started at the video time M. Moreover, for example, the touch panel or the mouse that constitutes the input apparatus 110 keeps being tapped or clicked, by which the link area information (i.e. the coordinate information, the time information, the time point information, etc.) is generated between the video times t11 and t12.

Figure 23:
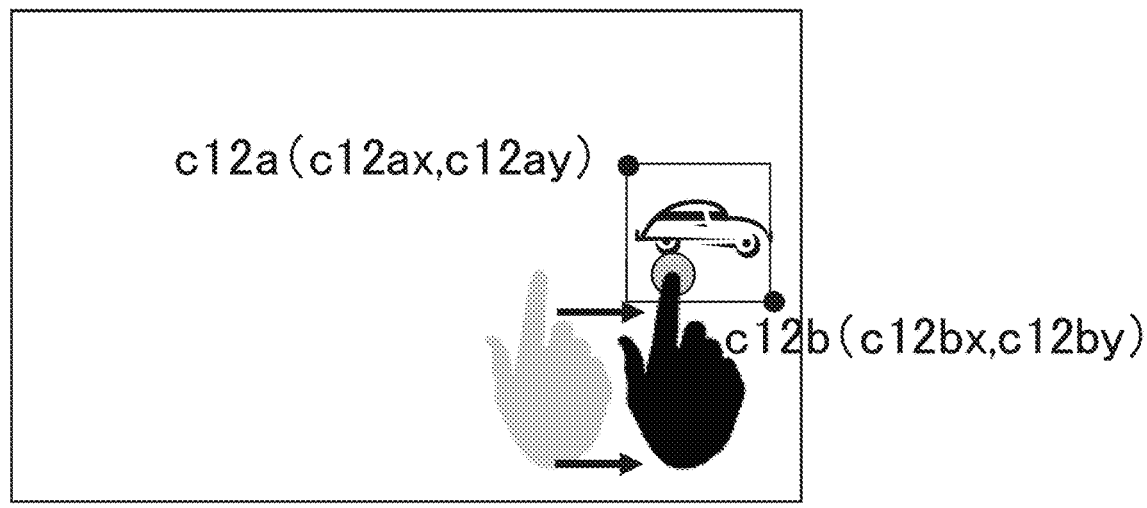
FIG. 23 is a conceptual diagram illustrating another image for explaining the operation of the interface apparatus for designating the link destination, according to the example.

Then, as illustrated in FIG. 23, the position of the automobile in the video in the screen of the display 120 is moved from the position c11 to the position c12 according to the video time t11 changing to the video time t12. Between the video times t11 and t12, the frame mark follows the movement of the automobile in the screen of the display 120 by the manual operation by the user of the input apparatus 110, for example, by the manual operation using the user's vision, such as sliding the touch panel while the touch panel keeps being tapped, or moving the mouse while the mouse keeps being clicked. In accordance with the movement of the frame mark, the coordinate information determined from the frame mark at each reproduction time is generated as a part of the link area information (refer to FIG. 3), together with the time information and the time point information.

As illustrated above in FIG. 20 to FIG. 23, according to the example, between the video times t8 and t9, and between the video times t11 and t12, the link areas are set discontinuously from each other on the video time axis. At that time, between the video times t9 and t11 can be set as a time in which the link area is not set. Moreover, according to the example, the coordinate information is not generated between the reproduction times t9 and t11. In other words, it is possible to prevent the data amount from being enlarged as a whole, by preventing unnecessary data from being generated in order to perform desired link destination designation, or by preventing unnecessary data for the link area information from being stored.

In the above manner, the operation of generating and storing the link area information (refer to FIG. 3) is completed on the interface apparatus for designating the link destination (refer to FIG. 1) illustrated in the flowcharts in FIG. 7 and FIG. 8. Particularly in the example, if there are two or more discontinuous link areas on the video time axis for the same video content, the link area information (refer to FIG. 3) can be efficiently generated and stored, which is extremely useful in practice.

Next, with reference to FIG. 24 to FIG. 28, an explanation will be given to a case where the size of the frame mark or the link area is changed in the middle of the operation of generating the link area information during the video reproduction, which is appropriately performed on the user interface apparatus for designating the link destination according to the example.

Figure 24:
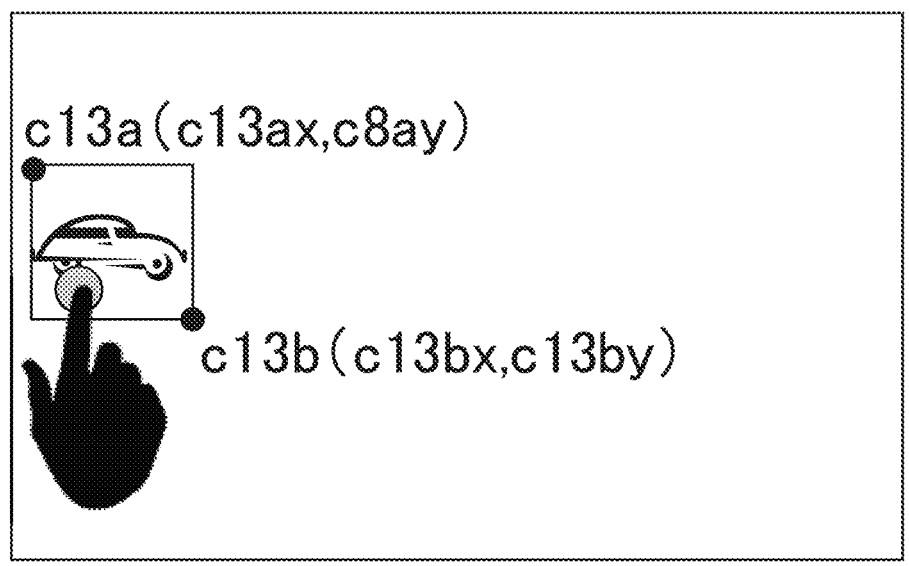
FIG. 24 is a conceptual diagram illustrating another image for explaining the operation of the interface apparatus for designating the link destination, according to the example.

As illustrated in FIG. 24, for example, as in the case in FIG. 14, a video time at which it is desired to start the setting of the link area in the video is designated via the input apparatus 110. For example, when a video time t13 is designated, the video is temporarily stopped, and an upper left position c13a and a lower right position c13b of the frame mark are designated on the screen of the display 120 via the input apparatus 110. This operation is performed as the link area designation mode.

Then, the mode is changed to the link area recording mode, and for example, the touch panel or the mouse that constitutes the input apparatus 110 is tapped or clicked, by which the recording of the link area information is started at the video time t13. Moreover, for example, the touch panel or the mouse that constitutes the input apparatus 110 keeps being tapped or clicked, by which the link area information (i.e. the coordinate information, the time information, the time point information, etc.) is generated between the video times t13 and t14.

Figure 25:
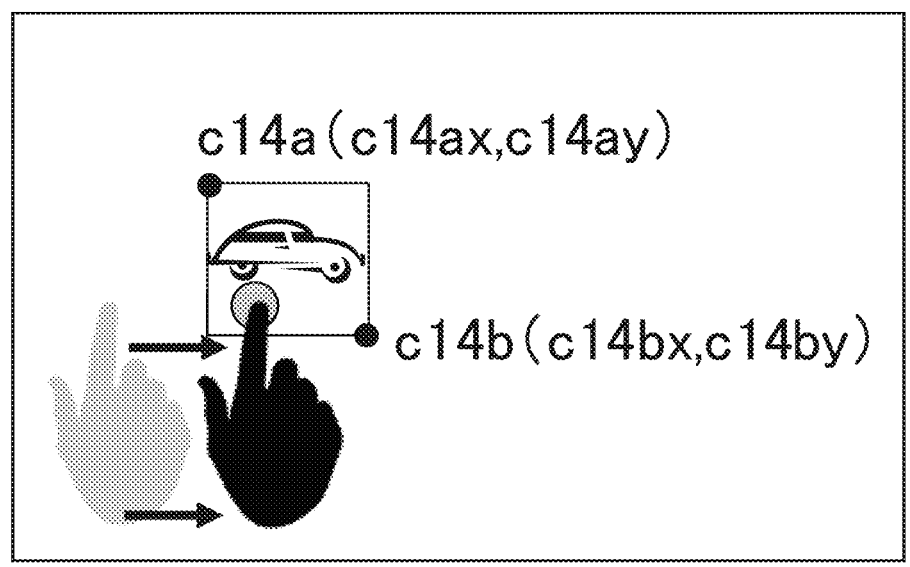
FIG. 25 is a conceptual diagram illustrating another image for explaining the operation of the interface apparatus for designating the link destination, according to the example.

Then, as illustrated in FIG. 25, for example, the position of the automobile in the video in the screen of the display 120 is moved from a position c13 to a position c14 according to the video time t13 changing to the video time t14. At that time, at the video time t13, for example, the touch panel or the mouse that constitutes the input apparatus 110 is tapped or clicked. Moreover, a tap position or a click position is slid or moved in accordance with the automobile in the video while the contact (or click) is maintained. By these operations, coordinates c14a and coordinate c14b are recorded at the video time t14. Then, at the video time t14, if the contact with the touch panel or the click of the mouse is released, the video is temporarily stopped. In other words, it is temporarily set in still image reproduction.

Figure 26:
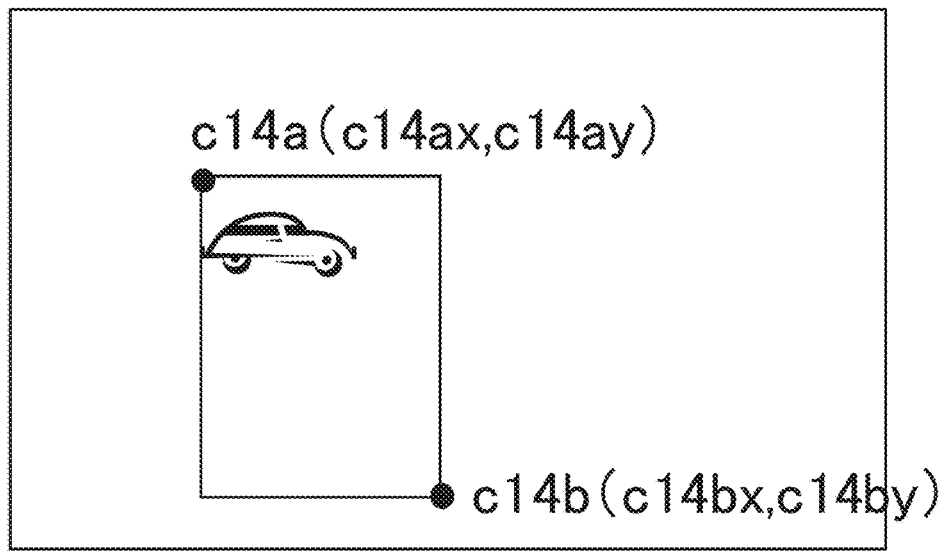
FIG. 26 is a conceptual diagram illustrating another image for explaining the operation of the interface apparatus for designating the link destination, according to the example.

Then, as illustrated in FIG. 26, for example, the upper left position and the lower right position of the frame mark are changed by the same operation as in FIG. 24, with respect to the video that is subject to the still image reproduction, at the video time t14. In other words, the area and shape of the link area are changed. In the example illustrated in FIG. 25 to FIG. 26, the lower right coordinates are moved in a lower right direction while the upper left coordinates of the frame mark or the link area are fixed, and a change is applied to increase the size of the frame or the link area.

Figure 27:
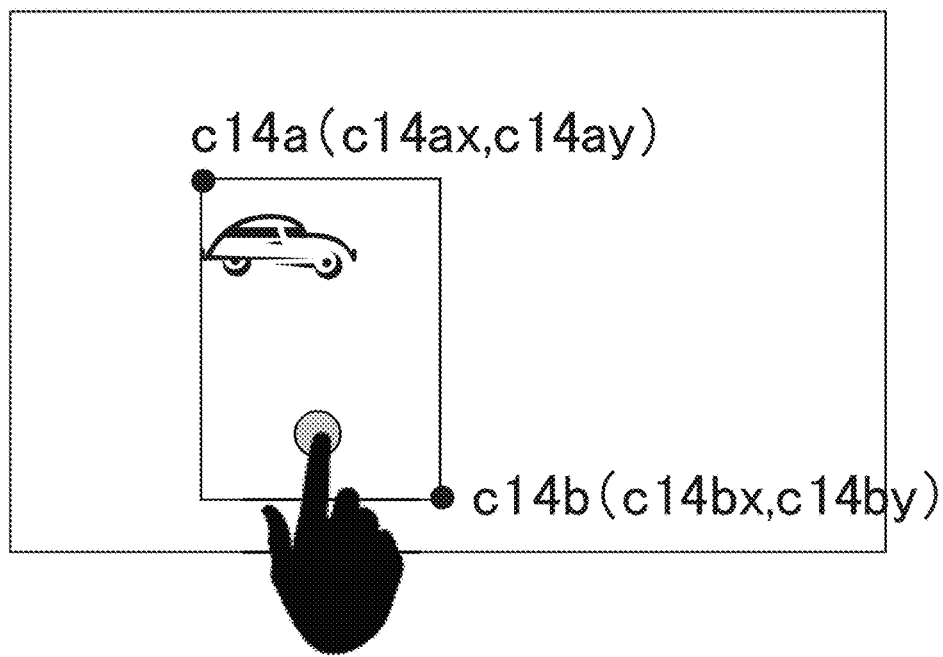
FIG. 27 is a conceptual diagram illustrating another image for explaining the operation of the interface apparatus for designating the link destination, according to the example.

Then, as illustrated in FIG. 27, for example, at the video time t14, the motion picture reproduction is restarted, i.e. the link area recording mode is restarted. For example, the touch panel or the mouse that constitutes the input apparatus 110 is tapped or clicked, by which the recording of the link area information is restarted at the video time t14.

Figure 28:
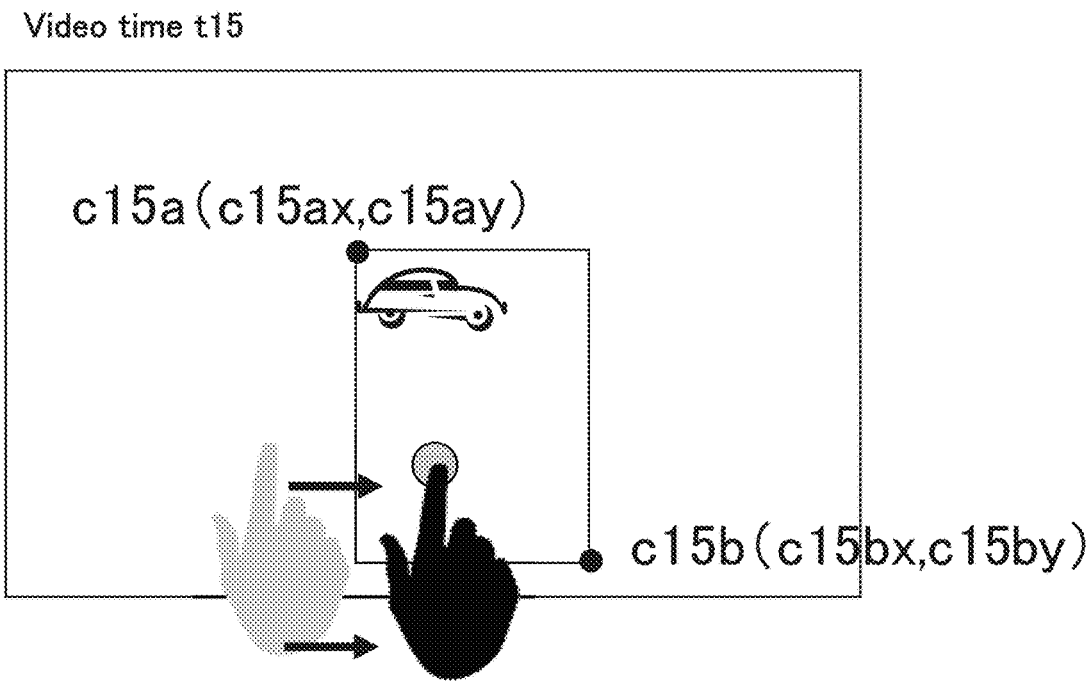
FIG. 28 is a conceptual diagram illustrating another image for explaining the operation of the interface apparatus for designating the link destination, according to the example.

Moreover, as illustrated in FIG. 28, for example, the touch panel or the mouse that constitutes the input apparatus 110 keeps being tapped or clicked, by which the link area information (i.e. the coordinate information, the time information, the time point information, etc.) is generated between the video times t14 and t15. At this time, the link area information is generated by using the frame mark whose size and shape were changed in FIG. 26.

As explained above in FIG. 24 to FIG. 28, according to the example, the size of the link area is changed at the video time t14 in the middle of the video times t13 to t15. In other words, if the size of the object that exists in the video is changed during the video reproduction as is common in general, the size of the link area can be changed, as occasion demands. Moreover, since it can be performed via a simple operation on the input apparatus 110, it is extremely useful in practice.

Figure 29:
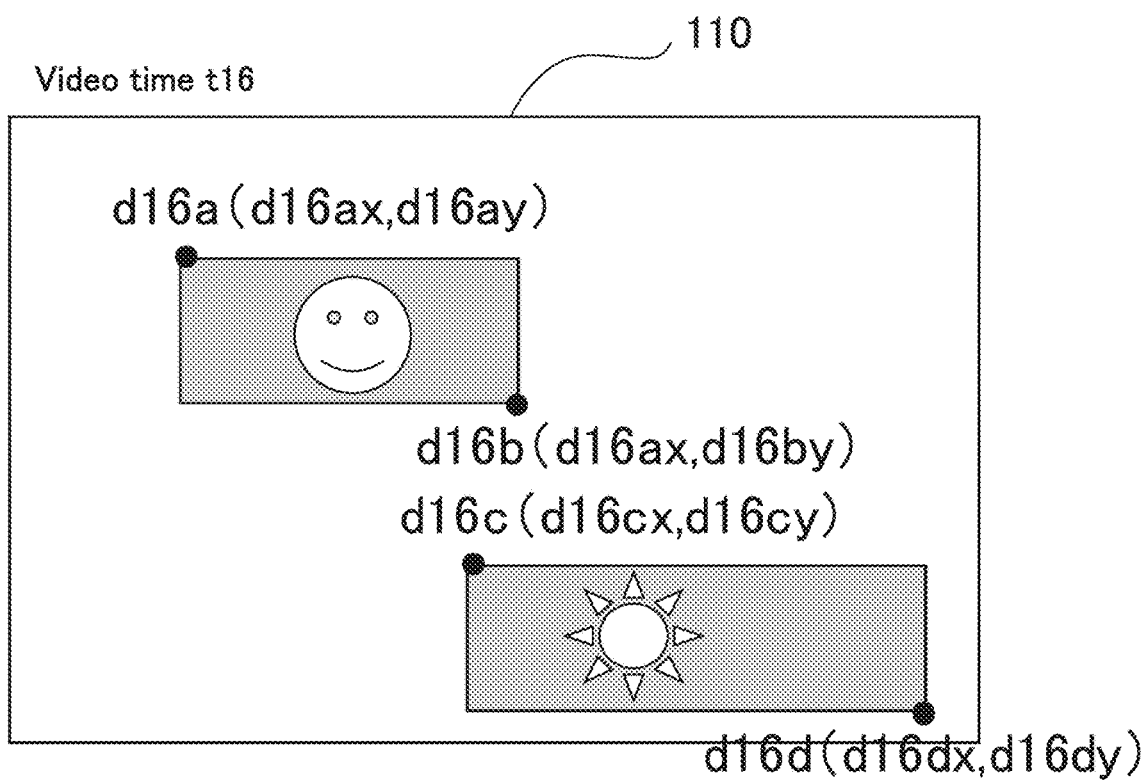
FIG. 29 is a conceptual diagram illustrating another image for explaining the operation of the interface apparatus for designating the link destination, according to the example.

Moreover, as illustrated in FIG. 29, for example, in the example explained above, it is also possible to establish a mechanism for separately setting up a link for each of a plurality of objects on the interface apparatus 100, where a plurality of objects appear at the same time or in parallel in the same video content. Namely, the operation in the link area recording mode via the input apparatus 110 by the user may be performed at a plurality of opportunities in a manner corresponding to the plurality of objects.

More specifically, the process in the step S15 illustrated in FIG. 5 or FIG. 7 may be performed a plurality of times, so that (i) the coordinates d16a and the coordinates d16b which specify one link area and (ii) the coordinates d16c and the coordinates d16c which specify another link area may be designated at a video time t16 to set two frame marks (i.e. two link areas).

The setting of the frame marks in this case (i.e. the process in the step S15, etc.) may be performed on the video content in which the same still image is reproduced with respect to the generation of a plurality of link area information, or may be performed on the video content in which different still images are reproduced with respect to the generation of the plurality of link area information. The example in FIG. 29 exemplifies the case where the two link areas are designated. According to the video content, however, three or more link area can be also designated in the similar operation.

As described above, according to the example, it is possible to simply establish, on the interface apparatus 100, an environment in which a plurality of link destinations can be selected later in one video content on the interface apparatus 200, which is useful.

Next, with reference to a flowchart in FIG. 9 together with FIG. 1 to FIG. 4, an explanation will be given to an operation of the interface apparatus 200 having the basic configuration as illustrated in FIG. 2, and its detailed configuration.

Figure 9:
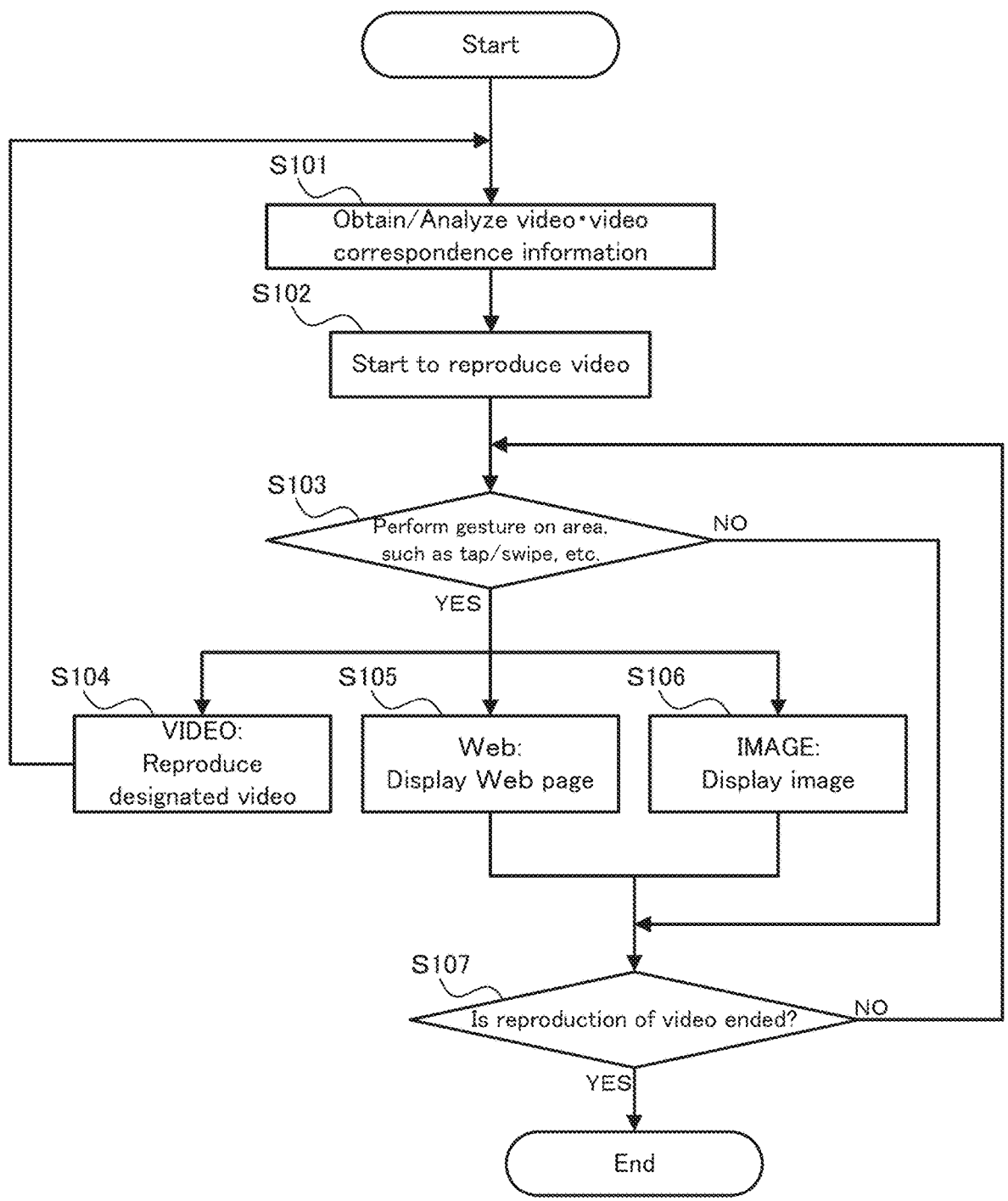
FIG. 9 is a flowchart illustrating a flow of one example of an operation of the interface apparatus for the viewer, according to the example.

In FIG. 9, firstly, video data is obtained by the content obtaining unit 203 via the communication unit 202, and the link area information (refer to FIG. 3) is stored into the storage apparatus 204 with the video data (step S101). The obtainment here is performed, for example, via the Internet, as illustrated in FIG. 4.

The video correspondence information 205 according to the example includes the plurality of link area information 1, 2, and so on, and is generated and stored in advance by the interface apparatus 100. As the video correspondence information is obtained, the coordinate information (refer to FIG. 3) from among the link area information that constitutes the video correspondence information is analyzed by the area information analysis unit 207. In other words, each link area that was designated in advance on the interface apparatus 100 is specified.

Before or after, or in parallel with this, the transition information (refer to FIG. 3) from among the link area information is obtained on the transition information obtaining unit 208. In other words, the link destination (specifically, another video, a Web page, a type of a specified image, etc.) of each link area that was designated in advance by the interface apparatus 100 is specified.

By these, how the link destination was set up on the content provider side can be figured out by the information obtainment and the information analysis here. The process associated with the video correspondence information in the step S101 may be automatically performed on the interface apparatus 200, along with the obtainment of the video data without the viewer's awareness.

Then, before or after, or in parallel with the obtainment of the video data and the link area information, the video reproduction is started (step S102). Specifically, the video data is reproduced by the video reproduction unit 212 as time series data, and is reproduced on the display 220 under control of the video display unit 216a.

During the video reproduction, it is monitored whether or not a predetermined operation on the input apparatus 210 is performed with respect to a video part defined by the link area analyzed and specified in the step S101, among the video that is being displayed (step S103).

More specifically, which predetermined type of operation, out of the tap, swipe, drag, and the like, is performed (or no operation is performed) is specified on the input gesture specification unit 301, on the basis of behavior (i.e. a time and spatial change) of an operation signal (i) which indicates an operation position, presence or absence of the operation, or the like, and (ii) which is inputted via the position input unit 218 from the input apparatus 210, at each time point of the video time. In parallel with, or before or after this, timing of performing the predetermined operation is specified by the reproduction time specification unit 302 on the basis of the behavior of the operation signal. In parallel with, or before or after this, with respect to which video part the predetermined operation is performed, is specified by an area search unit 303 on the basis of the behavior of the operation signal. If an effective predetermined operation is performed, the transition information extraction unit 211a extracts the transition information associated with the effective predetermined operation, and transfers it to the transition information obtaining unit 208 in order to perform a transition operation corresponding to the extracted transition information.

The monitoring in the step S103 is repeatedly continued if it is determined that no gesture is performed (the step S103: NO) as long as the video reproduction is not ended (step S107: NO).

In the monitoring in the step S103, if it is determined that the gesture or the operation performed by the viewer on the input apparatus 210 is the "VIDEO", i.e. that the gesture or the operation corresponds to a case of "reproducing a designated video" in accordance with a preset rule, then, the process moves to a step S104, and the video reproduced on the display 220 is changed to the designated video under control of the display control unit 216 (step S104). Moreover, back in the step S101, the subsequent processes are repeated in the same manner. At this time, the designated video (i.e. a different video from the video that has been reproduced so far) is indicated by the transition information included in the link area information, and has been already obtained (in the step S102) on the transition information obtaining unit 208. Therefore, quick or instant video change is possible.

In the monitoring in the step S103, if it is determined that the gesture or the operation performed by the viewer on the input apparatus 210 is the "Web", i.e. that the gesture or the operation corresponds to a case of "displaying a Web page" in accordance with a preset rule, then, the process moves to a step S105, and the video reproduced on the display 220 is changed to the display of the Web page under the control of the display control unit 216 (step S105). Then, the process moves to a step S107. At this time, the display of the Web page is indicated by the transition information included in the link area information, and has been already obtained (in the step S102) on the transition information obtaining unit 208. Therefore, quick or instant display of the Web page is possible.

In the monitoring in the step S103, if it is determined that the gesture or the operation performed by the viewer on the input apparatus 210 is the "IMAGE", i.e. that the gesture or the operation corresponds to a case of "displaying an image", which is a particular image, in accordance with a preset rule, then, the process moves to a step S106, and the video reproduced on the display 220 is changed to the display of the image under the control of the display control unit 216 (step S106). Then, the process moves to the step S107. At this time, the display of the image is indicated by the transition information included in the link area information, and has been already obtained (in the step S102) on the transition information obtaining unit 208. Therefore, quick or instant display of the image is possible.

In any case, if it is determined that the video reproduction is to be ended in the step S107, a series of process operations according to the example is ended.

In the example, under the control of the display control unit 216, the video content that was originally reproduced in the step S202 may be reproduced in a manner of being restarted from a change time point, when (i) the reproduction of another video after the step S104, (ii) the reproduction of the Web page after the step S104, and (iii) the reproduction of the image after the step S106 are ended. By virtue of such a configuration, if the motion picture content that has a series of meanings, such as, for example, a movie and a drama, is reproduced, the viewer can watch the motion picture content without excess or deficiency with just watching the content of the link destination in the middle of the reproduction of the motion picture content, which is useful.

Alternatively, at least one of (i) the reproduction of another video after the step S104, (ii) the reproduction of the Web page after the step S104, and (iii) the reproduction of the image after the step S106 may be window-displayed in the video content that is originally reproduced in the step S102 (the video content that is originally reproduced may keep being reproduced).

As described above, according to the example, by using the link area information generated in advance on the interface apparatus 100 (refer to FIG. 1), the video content can be jumped to a desired link destination during reproduction on the interface apparatus 200 (refer to FIG. 2).

Particularly in the example, an operation of selecting the object in the video content can be correctly or certainly performed on the viewer side, for example, regardless of the specifications, standards, or the like of the various types of displays 220 that are individually used by the viewers, or regardless of the expansion, reduction, or segments of the display. This point will be explained with reference to FIG. 30 to FIG. 32.

Figure 30:
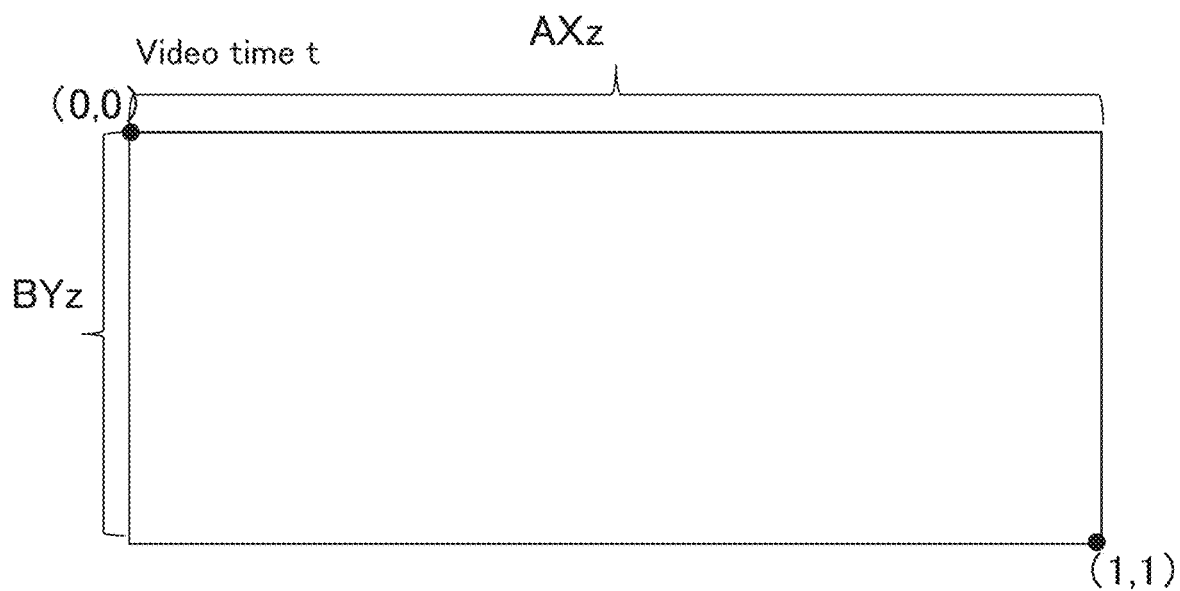
FIG. 30 is a conceptual diagram illustrating one image for explaining the operation of the interface apparatus for the viewer, according to the example.

As illustrated in FIG. 30, even if a field angle Xz upon recording is changed to A times the field angle Xz and a field angle Yz is changed to B times the field angle Yz at the stage of the reproduction after the specification of the link area information, there is no change but the upper left point of the video is treated as the coordinates (0,0) and the lower right point is treated as the coordinates (1,1).

Figure 31:
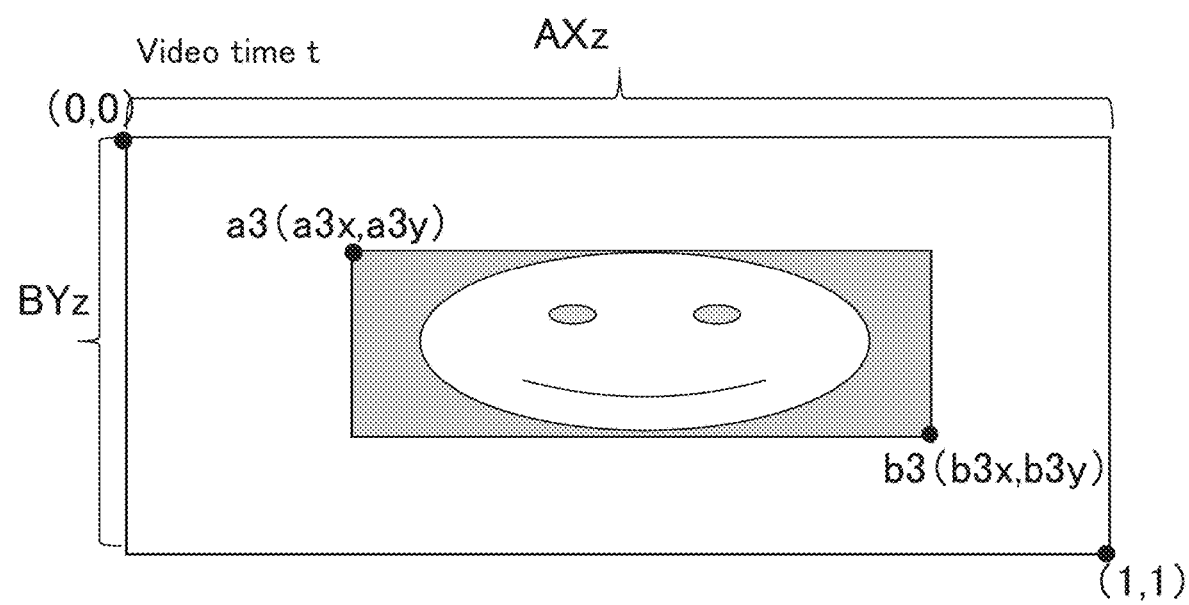
FIG. 31 is a conceptual diagram illustrating another image for explaining the operation of the interface apparatus for the viewer, according to the example.
Figure 32:
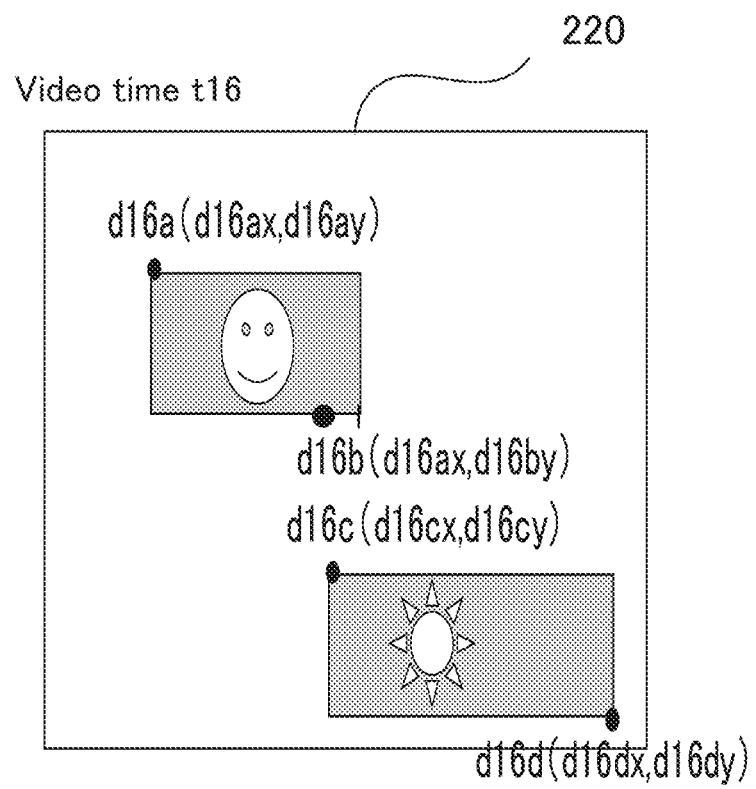
FIG. 32 is a conceptual diagram illustrating another image for explaining the operation of the interface apparatus for the viewer, according to the example.

Therefore, as illustrated in FIG. 31, two coordinates a3, b3 that determine the link area upon reproduction are calculated on the basis of the ratio information in which the maximum values on the x axis and the y axis are respectively 1. Thus, even if the video is "expanded" or "reduced" with the same magnification on the x axis and the y axis respectively, or even if the video is changed in scale to be a laterally long or longitudinally long video with respective different magnifications on the x axis and the y axis respectively, an area that is desirably set as the link area upon recording can be held upon reproduction.

Moreover, depending on the specification of the display 220 (particularly in the case of a small display), only a part near the center of the video may be segmented and displayed, or may be reduced and displayed. At this time, for example, even if the video on the display 110 on the content provider side that performs the link designating operation is a standard video (refer to FIG. 29), the intended link destination as corresponding to the object that is to be selected by the viewer is accurately displayed in each of a plurality of link areas on a reduced or segmented video on the display 220 on the viewer side illustrated in FIG. 32.

As described above, according to the example, the video content can be jumped to a desired link destination during the reproduction regardless of the type of the display used on the interface apparatus 200, which is extremely useful in practice.

On the viewer side, due to its nature, it is basically desirable to provide not an obsolete or out-of-date link destination but various types of link destinations with the latest situation considered. Moreover, even regarding the video content, it is also desirable to jump the video content to the link destination as the occasion demands, while watching as many versatile video content as possible with less restriction (in particular, normal programs, movies, dramas, and so on, that can be enjoyed without being aware of the link). Moreover, in reality, various types of displays are used on the viewer side.

According to the example explained in detail above, it is possible to simply and inexpensively designate the link destination on the content provider side, and it is possible to realize the environment which enables jumping to a desired link destination (that can also include the latest link destination) with a high degree of freedom on the video content on the viewer side.

The present invention is not limited to the aforementioned embodiments and example, but various changes may be made, if desired, without departing from the essence or spirit of the invention which can be read from the claims and the entire specification. An interface apparatus for designating a link destination, an interface apparatus for a viewer, and a computer program that involve such changes are also intended to be within the technical scope of the present invention.

DESCRIPTION OF REFERENCE NUMERALS 100 interface apparatus for designating a link destination
101 video reproducing apparatus with a link designation function
110 input apparatus
120 display
200 interface apparatus for a viewer
201 video reproducing apparatus with a link selection function
210 input apparatus
220 display

The invention claimed is:

1. An interface apparatus for a viewer for selectively displaying, during reproduction and display of video content, video correspondence information which corresponds to the video content in response to a predetermined operation by the viewer, the interface apparatus comprising:
  a displaying device configured to reproduce and display the video content and to display the video correspondence information, in a screen;
  a display controlling device configured to control said displaying device to start the reproduction and display of the video content;
  an inputting device configured to input, during the reproduction and display, the predetermined operation in the screen; and
  a determining device configured to monitor and determine, during the reproduction and display, whether or not the predetermined operation is inputted with respect to a video part, which is defined by link area information associated with the video content displayed at each time point of the video part among the video content,
  wherein said display controlling device controls said displaying device to
  (i) display, in response to the predetermined operation, the video correspondence information by switching from the video content to the video correspondence information or by stopping the video content and superimposing the video correspondence information onto the stopped video content, in accordance with a preset rule, and
  (ii) reproduce and display, upon an end of display of the video correspondence information, the video content in such a manner that the video content is restarted at a time point of the switching or the stopping, and
  wherein the preset rule comprises
    a rule for selecting the video correspondence information of a link destination, which is designated on the basis of the link area information made for designating the link destination associated with the video content displayed at each time point of said video part, and
    a rule for selecting one of a plurality of display forms associated with the link destinations in accordance with a distinction between a plurality of types of predetermined operations including more than one of tap, click, swipe, and drag at said inputting device.

2. The interface apparatus for a viewer according to claim 1, wherein
  said display controlling device controls said displaying device to start the reproduction and display of the video content, before or after, or in parallel with obtainment of the link area information.

3. The interface apparatus for a viewer according to claim 2, wherein
  the video correspondence information comprises a plurality of video correspondence information, and
  the preset rule further comprises a rule for selecting one or a plurality of the plurality of video correspondence information in accordance with the distinction, from among the plurality of video correspondence information designated on the basis of the link area information.

* * * * *